(12) United States Patent
Jing et al.

(10) Patent No.: US 11,781,004 B2
(45) Date of Patent: Oct. 10, 2023

(54) ELECTRONIC TELECOMMUNICATIONS ARTICLES COMPRISING CROSSLINKED FLUOROPOLYMERS AND METHODS

(71) Applicant: 3M INNOVATIVE PROPERTIES COMPANY, St. Paul, MN (US)

(72) Inventors: Naiyong Jing, St. Paul, MN (US); Cheng Gu, Golden Valley, MN (US); Klaus Hintzer, Kastl (DE); Tho Q. Nguyen, Bloomington, MN (US); Peter J. Scott, Stillwater, MN (US); Cheng Li, Shanghai (CN); Zai-Ming Qiu, Woodbury, MN (US); Yong Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/766,563

(22) PCT Filed: Nov. 3, 2020

(86) PCT No.: PCT/US2020/058660
§ 371 (c)(1),
(2) Date: Apr. 5, 2022

(87) PCT Pub. No.: WO2021/091864
PCT Pub. Date: May 14, 2021

(65) Prior Publication Data
US 2023/0135565 A1    May 4, 2023

Related U.S. Application Data

(60) Provisional application No. 62/930,366, filed on Nov. 4, 2019.

(30) Foreign Application Priority Data

Dec. 11, 2019  (WO) ................ PCT/CN2019/124451

(51) Int. Cl.
*H01B 3/44* (2006.01)
*C08L 27/18* (2006.01)
*C08K 3/36* (2006.01)

(52) U.S. Cl.
CPC ................ *C08L 27/18* (2013.01); *C08K 3/36* (2013.01); *H01B 3/445* (2013.01); *C08K 2201/001* (2013.01); *C08L 2203/206* (2013.01); *C08L 2312/06* (2013.01)

(58) Field of Classification Search
CPC ............ H01B 3/44; C08L 27/12; C08L 27/18
See application file for complete search history.

(56) References Cited

U.S. PATENT DOCUMENTS

| | | | |
|---|---|---|---|
| 3,235,544 A | 2/1966 | Christena | |
| 3,243,429 A | 3/1966 | Ham | |
| 3,250,807 A | 5/1966 | Gerhard | |
| 3,250,808 A | 5/1966 | Moore, Jr. | |
| 3,332,907 A | 7/1967 | Angelo | |
| 3,499,859 A * | 3/1970 | Matherly | C08K 3/38 528/901 |
| 4,262,072 A | 4/1981 | Wendling | |
| 4,349,650 A | 9/1982 | Krespan | |
| 4,859,836 A * | 8/1989 | Lunk | C08L 27/12 219/505 |
| 5,268,405 A | 12/1993 | Ojakaar | |
| 5,274,159 A | 12/1993 | Pellerite | |
| 5,384,374 A | 1/1995 | Guerra | |
| 5,463,021 A | 10/1995 | Beyer | |
| 5,542,217 A | 8/1996 | Larivee, Jr. | |
| 5,708,131 A | 1/1998 | Morgan | |
| 5,880,204 A | 3/1999 | McCarthy et al. | |
| 5,883,177 A | 3/1999 | Colaianna et al. | |
| 6,248,823 B1 | 6/2001 | Hrivnak et al. | |
| 6,299,799 B1 | 10/2001 | Craig | |
| 6,630,047 B2 | 10/2003 | Jing | |
| 6,685,793 B2 | 2/2004 | Jing | |

(Continued)

FOREIGN PATENT DOCUMENTS

| CN | 1173883 A | 2/1998 |
|---|---|---|
| CN | 1671757 | 9/2005 |

(Continued)

OTHER PUBLICATIONS

3M Dynamar Rubber Curative RC5125, 2014, 3M Safety Data Sheet, 11 pages.
3M™Fused Silica as a Polymeric Filler, 3M Advanced Materials Division, 2 pages.
Ameduri, "Fluoroelastomers: synthesis, properties and applications", Progress in Polymer Science, Feb. 2001, vol. 26, No. 1, pp. 105-187.
Amorphous Hucsrapolymer Technical Documnnis, AGC Inc. Chemicals Company, 1 page.
E, R and D glass properties, Saint-Gobain Vetrotex, 2 pages.
Fibertec, Microglass 9007D, 1 page.
Fibertec, Microglass 9110, 1 page.
Fibertec, Microglass 9132, 1 page.

(Continued)

*Primary Examiner* — Kuo Liang Peng
(74) *Attorney, Agent, or Firm* — Carolyn A. Fischer

(57) ABSTRACT

Electronic telecommunication articles are described comprising a crosslinked fluoropolymer layer. In typical embodiments, the crosslinked fluoropolymer layer is a substrate, patterned (e.g. photoresist) layer, insulating layer, passivation layer, cladding, protective layer, or a combination thereof. Also describes are methods of making an electronic telecommunications article and method of forming a patterned fluoropolymer layer. The fluoropolymer preferably comprises at least 80, 85, or 90% by weight of polymerized units of perfluorinated monomers and cure sites selected from nitrile, iodine, bromine, and chlorine. Illustrative electronic communication articles include integrated circuits, printed circuit boards, antennas, and optical fiber cables. Fluoropolymer compositions are also described.

19 Claims, 5 Drawing Sheets

(56) References Cited

U.S. PATENT DOCUMENTS

| | | | |
|---|---|---|---|
| 6,720,360 | B1 | 4/2004 | Grootaert |
| 6,833,403 | B1 | 12/2004 | Bladel |
| 6,943,228 | B2 | 9/2005 | Grootaert |
| 7,019,082 | B2 | 3/2006 | Matyjaszewski |
| 7,019,083 | B2 | 3/2006 | Grootaert |
| 7,026,032 | B2 | 4/2006 | Lee |
| 7,288,619 | B2 | 10/2007 | Qiu |
| 7,638,581 | B2 | 12/2009 | Jing |
| 7,892,280 | B2 | 2/2011 | Pathak |
| 8,776,837 | B2 | 7/2014 | McKeen |
| 8,969,500 | B2 | 3/2015 | Hintzer et al. |
| 9,296,918 | B2 | 3/2016 | Olson |
| 9,790,347 | B2 | 10/2017 | Amos |
| 9,815,969 | B2 | 11/2017 | Amos |
| 10,190,015 | B2 | 1/2019 | Lloyd |
| 11,248,117 | B2 | 2/2022 | Jiang |
| 11,254,764 | B2 | 2/2022 | Verschuere |
| 2003/0022073 | A1 | 1/2003 | Wang |
| 2004/0024134 | A1* | 2/2004 | Grootaert ............ C08F 214/184 525/326.2 |
| 2004/0077775 | A1 | 4/2004 | Audenaert |
| 2005/0171257 | A1 | 8/2005 | Wakui |
| 2005/0250921 | A1 | 11/2005 | Qiu |
| 2005/0261431 | A1 | 11/2005 | Takahashi et al. |
| 2006/0147723 | A1 | 7/2006 | Jing |
| 2006/0148971 | A1 | 7/2006 | Jing |
| 2009/0018275 | A1 | 1/2009 | Campbell et al. |
| 2009/0087646 | A1 | 4/2009 | Sirejacob |
| 2011/0200826 | A1 | 8/2011 | Wilczek |
| 2012/0097159 | A1 | 4/2012 | Iyer |
| 2012/0154487 | A1 | 6/2012 | Sambhy et al. |
| 2014/0066572 | A1 | 3/2014 | Corveleyn et al. |
| 2014/0227533 | A1 | 8/2014 | Murakami |
| 2015/0296614 | A1* | 10/2015 | Williams ............... H05K 3/022 156/308.2 |
| 2016/0194512 | A1 | 7/2016 | Bandi et al. |
| 2016/0194520 | A1 | 7/2016 | Wilczek |
| 2017/0130009 | A1 | 5/2017 | Hosoda |
| 2018/0197927 | A1 | 7/2018 | Tan |
| 2019/0136109 | A1 | 5/2019 | Agapov et al. |
| 2020/0048420 | A1 | 2/2020 | Hosoda |
| 2020/0317948 | A1 | 10/2020 | Terada |
| 2021/0139687 | A1 | 5/2021 | Jing et al. |

FOREIGN PATENT DOCUMENTS

| | | |
|---|---|---|
| CN | 1871275 A | 11/2006 |
| CN | 101679562 A | 3/2010 |
| CN | 102471583 A | 5/2012 |
| CN | 102559051 A | 7/2012 |
| CN | 102604273 A | 7/2012 |
| CN | 104870542 | 6/2017 |
| CN | 106687863 | 7/2017 |
| CN | 108047189 A | 5/2018 |
| CN | 110914354 | 3/2020 |
| EP | 0540730 | 12/1997 |
| EP | 1 127 935 A1 | 8/2001 |
| EP | 1155055 | 4/2009 |
| EP | 1997795 | 3/2016 |
| EP | 3333229 | 6/2018 |
| EP | 2617738 | 5/2021 |
| EP | 3385325 | 9/2021 |
| JP | H07-202362 | 8/1995 |
| JP | 2001064465 | 3/2001 |
| JP | 2005142572 | 6/2005 |
| JP | 2012162708 | 8/2012 |
| JP | 2014070101 | 4/2014 |
| JP | 2015509113 | 3/2015 |
| KR | 2006-0083409 A | 7/2006 |
| KR | 2018-0044790 A | 5/2018 |
| WO | WO 1992-20720 | 11/1992 |
| WO | WO 1998-11146 | 3/1998 |
| WO | 2000/008076 | 2/2000 |
| WO | 2002/04534 A2 | 1/2002 |
| WO | WO 2002-44534 | 6/2002 |
| WO | WO 2004-011510 | 2/2004 |
| WO | 2005/017017 A1 | 2/2005 |
| WO | 2005/049687 A1 | 6/2005 |
| WO | WO 2006-086081 | 8/2006 |
| WO | WO 2006-102383 | 9/2006 |
| WO | WO 2008-094758 | 8/2008 |
| WO | WO 2011-043973 | 4/2011 |
| WO | WO 2012-106172 | 8/2012 |
| WO | WO 2014-075246 | 5/2014 |
| WO | WO 2015-066868 | 5/2015 |
| WO | WO 2015-088784 | 6/2015 |
| WO | WO 2015-134435 | 9/2015 |
| WO | 2015/187413 A1 | 12/2015 |
| WO | WO 2016-017801 | 2/2016 |
| WO | WO 2016-069674 | 5/2016 |
| WO | WO 2016-159102 | 10/2016 |
| WO | 2016/189000 A1 | 12/2016 |
| WO | WO 2017-004496 | 1/2017 |
| WO | WO 2017-070172 | 4/2017 |
| WO | WO 2017-094710 | 6/2017 |
| WO | WO 2018-107017 | 6/2018 |
| WO | 2019/018346 A1 | 1/2019 |
| WO | WO 2019-230568 | 5/2019 |
| WO | WO 2019-161153 | 8/2019 |
| WO | WO 2019-203243 | 10/2019 |
| WO | 2019/239320 A1 | 12/2019 |
| WO | WO 2019-239322 | 12/2019 |
| WO | WO 2019-239568 | 12/2019 |
| WO | WO 2019-241186 | 12/2019 |
| WO | WO 2020-070589 | 4/2020 |
| WO | WO 2020-132203 | 6/2020 |
| WO | WO 2020-137879 | 7/2020 |
| WO | WO 2020-145133 | 7/2020 |
| WO | WO 2021-088198 | 5/2021 |
| WO | WO 2021-090111 | 5/2021 |

OTHER PUBLICATIONS

Khaleel, "Design, Fabrication, and Testing of Flexible Antennas", INTECH, 2013, pp. 363-383.
Milker, "New Generation of Multifunctional Crosslinkers", 28 pages.
MIN-U-SIL, Fine Ground Silica, US Silica, Sep. 2017, 1 page.
Nittobo New Glass fabric for PCB, Nitto Boseki Co., Ltd., Nov. 2011, 28 pages.
Oliver, "Low-Loss Materials in High Frequency Electronics and the Challenges of Measurement", DuPont, Feb. 2015, 45 pages.
Owens, "Estimation of the Surface Free Energy of Polymers", Journal of Applied Polymer Science, 1969, vol. 13, pp. 1741-1747.
Owens, "Understanding the stability and environmental characteristics of a sustainable halon alternative", 3M Performance Materials, 12 pages.
Perez, Cytop™, 4 pages.
Polymide, Wikipedia, 5 pages.
Qiu, "Photolithographic Patterning of Cytop with Limited Contact Angle Degradation", Micromachines, 2018, vol. 9, No. 10, pp. 509(1)-509(10).
Review of Polyimides Used in the Manufacturing of Micro Systems, NASA Center for AeroSpace Information (CASI), Apr. 2007, 16 pages.
Runt, "Polymer blends and copolymer", Handbook of Thermal Analysis and Calorimetry, Applications to Polymers and Plastics, 2002, vol. 3, pp. 273-294.
Scheirs, Modern Fluoropolymers, 397-418 (1997).
Scheirs, Modern Fluoropolymers, 541-555 (1997).
Silane Coupling Agents, Connecting Across Boundaries, GelestInc., 2006, 12 pages.
Tanaka, "Miscibility and Isomorphic Cocrystallization in Blends of Ferroelectric Copolymers of Vinylidene Fluoride and Trifluoroethylene", Journal of Polymer Science: Part B: Polymer Physics, 1990, vol. 28, pp. 2183-2198.
Types of Antenna Coatings, Telewave, Inc., Sep. 2017, 5 pages.
Weldon, "Flex for 5G—Why Materials Matter", DuPont, 2018, 16 pages.

(56) References Cited

OTHER PUBLICATIONS

International Search Report for PCT International Application No. PCT/IB2020/058660, dated Apr. 19, 2021, 4 pages.
Jing, "Fluoropolymer Compositions Comprising Fluoropolymer with Polymerized Unsaturated Fluorinated Alkyl Ether Suitable For Copper And Electronic Telecommunications Articles", PCT Application No. IB2022/053281, filed Apr. 7, 2022, 47 pages.
Jing, "Fluoropolymer Compositions Comprising Uncrosslinked Fluoropolymer Suitable For Copper And Electronic Telecommunications Articles", PCT Application No. IB2022/053241, filed Apr. 6, 2022, 46 pages.
Jing, "Fluoropolymer Compositions Comprising Amorphous Fluoropolymer and Crystalline Fluoropolymer Suitable for Copper and Electronic Telecommunications Articles", PCT Application No. IB2022/053284, filed Apr. 7, 2022, 69 pages.
Qiu, "Electronic Telecommunications Articles and Compositions Comprising Fluroinated Curing Agents", PCT Application No. IB2022/053074, filed Apr. 1, 2022, 66 pages.
Rodriguez_ "Atmospheric chemistry of HFE-7300 and HFE-7500: Temperature dependent kinetics, atmospheric lifetimes, infrared spectra and global warming potentials", Atmospheric Environment, vol. 96, (2014), pp. 145-153.
Uses and Emissions of Liquid PFC Heat Transfer Fluids from the Electronics Sector_Office of Air and Radiation Office of Atmospheric Programs, Climate Change Division (Year: 2004).
International Search Report for PCT International Application No. PCT/IB2019/054868, dated Oct. 30, 2019, 6 pages.
International Search Report for PCT International Application No. PCT/IB2019/054870, dated Oct. 11, 2019, 4 pages.
International Search Report for PCT International Application No. PCT/IB2020/060061, dated Dec. 7, 2020, 4 pages.
International Search Report for PCT International Application No. PCT/US2019/036460, dated Sep. 20, 2019, 6 pages.
3M Dyneon Fluoroelastomers Compounding Guide, 3M Advanced Materials Division, 28 pages.
3M Dyneon Fluoroelastomers Product Guide,3M Advanced Materials Division, 2017, 20 pages.
3M Novec 7300 Engineered Fluid, 16 pages.
Hintzer, Ullmann's Encyclopedia of Industrial Chemistry 7th Edition—Chapter: Fluoropolymers, Organic, 4-6 (2013).

* cited by examiner

ELECTRONIC TELECOMMUNICATIONS ARTICLES COMPRISING CROSSLINKED FLUOROPOLYMERS AND METHODS

SUMMARY

In one embodiment, electronic telecommunication articles are described comprising a crosslinked fluoropolymer layer. In typical embodiments, the crosslinked fluoropolymer layer is a substrate, patterned (e.g. photoresist) layer, insulating layer, passivation layer, cladding, protective layer, or a combination thereof.

In another embodiment, a method of making an electronic telecommunications article is described comprising providing a film or coating solution comprising a fluoropolymer; and applying the film or coating solution to a component of an electronic telecommunications article. The coating solution typically further comprises a fluorinated solvent. The method further comprises crosslinking the fluoropolymer by exposure to heat, actinic radiation, or a combination thereof.

In another embodiment, a method of forming a patterned fluoropolymer layer is described comprising applying a fluoropolymer film to a substrate; selectively crosslinking portions of the fluoropolymer film by exposure to actinic radiation; and removing uncrosslinked portions of the fluoropolymer film.

In each of these embodiments, the fluoropolymer preferably comprises at least 80, 85, or 90% by weight of polymerized units of perfluorinated monomers and cure sites selected from nitrile, iodine, bromine, and chlorine.

Illustrative electronic communication articles include integrated circuits, printed circuit boards, antennas, and optical fiber cables.

DETAILED DESCRIPTION

Figure 1:
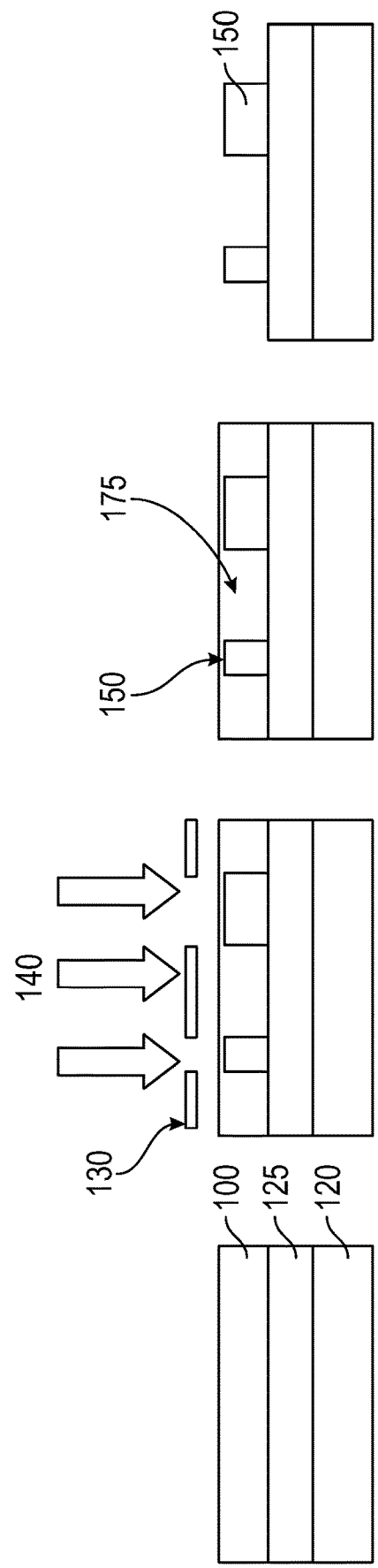
FIG. 1 is a schematic cross-sectional diagram of forming a patterned fluoropolymer layer by photolithography in an illustrative embodiment of the manufacture of an integrated circuit (IC).

Presently described are certain fluoropolymer compositions (e.g. films and coatings) for use in electronic telecommunication articles. As used herein, electronic refers to devices using the electromagnetic spectrum (e.g. electrons, photons); whereas telecommunication is the transmission of signs, signals, messages, words, writings, images and sounds or information of any nature by wire, radio, optical or other electromagnetic systems.

Polyimide material are used extensively in the electronic telecommunications industry. The structure of poly-oxydiphenylene-pyromellitimide, "Kapton" is as follows:

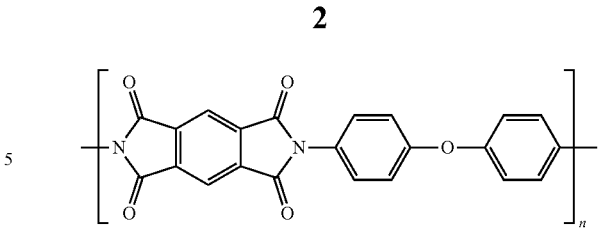

Polyimide films exhibited good insulating properties with dielectric constants values in the range of 2.78-3.48 and dielectric loss between 0.01 and 0.03 at 1 Hz at room temperature.

Perfluoropolymers can have substantially lower dielectric constants and dielectric loss properties than polyimides which is particularly important for fifth generation cellular network technology ("5G") articles. For example, crosslinked fluoropolymer compositions described herein can have a dielectric constant (Dk) of less than 2.75, 2.70, 2.65, 2.60, 2.55, 2.50, 2.45, 2.40, 2.35, 2.30, 2.25, 2.20, 2.15, 2.10, 2.05, 2.00, or 1.95. In some embodiments, the dielectric constant is at least 2.02, 2.03, 2.04, 2.05. Further, the crosslinked fluoropolymer compositions described herein can have a low dielectric loss, typically less than 0.01, 0.009, 0.008, 0.007, 0.006, 0.005, 0.004, 0.003, 0.002, 0.001, 0.0009, 0.0008, 0.0007, 0.0006, 0.0005, 0.0004, 0.0003. In some embodiments, the dielectric loss is at least 0.00022, 0.00023, 0.00024, 0.00025. The dielectric properties (e.g. constant and loss) can be determined according to the test method described in the examples. As the number of non-fluorine atoms increases (e.g. number of carbon-hydrogen and/or carbon-oxygen bonds increases) the dielectric constant and dielectric loss also typically increases.

However, perfluoropolymers have not been used in place of polyimides is various electronic telecommunications articles are least in part by the lack of perfluoropolymer materials that can be crosslinked by exposure to actinic and more preferably ultraviolet radiation. Crosslinked perfluoropolymer materials can have improved mechanical properties in comparison to uncrosslinked perfluoropolymer materials. Hence, the perfluoropolymer compositions described are suitable for use in place of polyimides in various electronic telecommunication articles.

In one embodiment, the electronic telecommunication article is an integrated circuit or in other words a silicon chip or microchip, i.e. a microscopic electronic circuit array formed by the fabrication of various electrical and electronic components (resistors, capacitors, transistors, and so on) on a semiconductor material (silicon) wafer.

In one embodiment, the fluoropolymer composition described herein can be used to form a patterned (e.g. photoresist) layer. Fluoropolymer compositions as described herein can be used as a negative photoresist in a variety of fabrication techniques. In some embodiments, (e.g. sacrificial) photoresist materials are etched away and do not remain in the finished article. In other embodiments, the photoresist material may be present in the finished article. Various integrated circuit designs have been described in the literature.

With reference to FIG. 1, in one embodiment, a method of forming a patterned fluoropolymer layer is described comprising applying a fluoropolymer film 100 to a substrate (e.g. silicon wafer 120 or the passivation (e.g. $SiO_2$) layer 125 coated surface thereof); selectively crosslinking portions of the fluoropolymer film by exposure to actinic radiation; and removing uncrosslinked portions of the fluoropolymer film.

In some embodiments, the method further comprises providing a mask (e.g. photomask) 130 having one or more opening between the fluoropolymer film 100 and a source of actinic (e.g. e-beam or UV) radiation 140 and exposing the fluoropolymer film to actinic radiation through at least one opening of the mask.

As known in the art, the mask includes actinic energy (e.g. UV light) transmitting portions and portions that are non-transmitting of actinic energy (e.g. UV light). Photomasks typically comprise a transparent substrate, with a non-transmitting mask pattern on the surface of the substrate. The substrate is typically (e.g. highly pure quartz) glass, that is transparent to the illumination (i.e. wavelengths and intensity) of the photolithography process employed. The mask is typically prepared by selective deposition or selective etching of a mask material. Common non-light-transmitting mask materials include chrome metal, iron oxide, molybdenum silicide, etc., as known in the art.

After exposure, the fluoropolymer film comprises a patterned fluoropolymer layer comprising portions of cured or in other words crosslinked fluoropolymer 150 and portions of uncured or in other words uncrosslinked fluoropolymer 175.

In some embodiments, the method further comprises removing portions of uncrosslinked fluoropolymer film by dissolving the uncrosslinked portions in a solvent 160 (e.g. washing the fluoropolymer film with fluorinated solvent). The portions of cured or in other words crosslinked fluoropolymer 150 remains on the surface of the substrate as a patterned fluoropolymer layer. In this embodiment, the substrate or (e.g. $SiO_2$) coated surface thereof that comes in contact with the solvent is substantially insoluble in the solvent utilized for removing the uncrosslinked portions of the fluoropolymer film. In favored embodiments, the solvent is a fluorinated solvent.

In some embodiments, particularly when it is desirable to apply a thin fluoropolymer film to the substrate, the method comprises applying a coating solution (e.g. spin coating) to the substrate, wherein the coating solution comprises a fluorinated solvent and a fluoropolymer. In some embodiments, the fluoropolymer preferably comprises predominantly polymerized units of perfluorinated monomers and cure sites. The coating further comprises a curing agent that reacts with the cure sites in the presence of actinic (e.g. UV) radiation thereby crosslinking the fluoropolymer. The method typically comprises removing the fluorinated solvent (e.g. by evaporation). In this embodiment, the substrate or (e.g. $SiO_2$) coated surface thereof that comes in contact with the solvent is substantially insoluble in the fluorinated solvent of the coating solution. The fluorinated solvent for removing the uncrosslinked portions of the fluoropolymer film and the fluorinated solvent of the coating solution can be the same or different fluorinated solvents. Further, the method typically comprises recycling, or in other words reusing, the fluorinated solvent utilized to remove the uncrosslinked portions of the fluoropolymer film and/or the fluorinated solvent of the coating solution.

In other embodiments, the uncured portions 175 may be removed with other solventless methods, such as laser ablation.

The patterned fluoropolymer layer can be used to fabricate other layers such as a circuit of patterned electrode materials. Suitable electrode materials and deposition methods are known in the art. Such electrode materials include, for example, inorganic or organic materials, or composites of the two. Exemplary electrode materials include polyaniline, polypyrrole, poly(3,4-ethylenedioxythiophene) (PE-DOT) or doped conjugated polymers, further dispersions or pastes of graphite or particles of metal such as Au, Ag, Cu, Al, Ni or their mixtures as well as sputter-coated or evaporated metals such as Cu, Cr, Pt/Pd, Ag, Au, Mg, Ca, Li or mixtures or metal oxides such as indium tin oxide (ITO), F-doped ITO, GZO (gallium doped zinc oxide), or AZO (aluminium doped zinc oxide). Organometallic precursors may also be used and deposited from a liquid phase.

Figure 2:
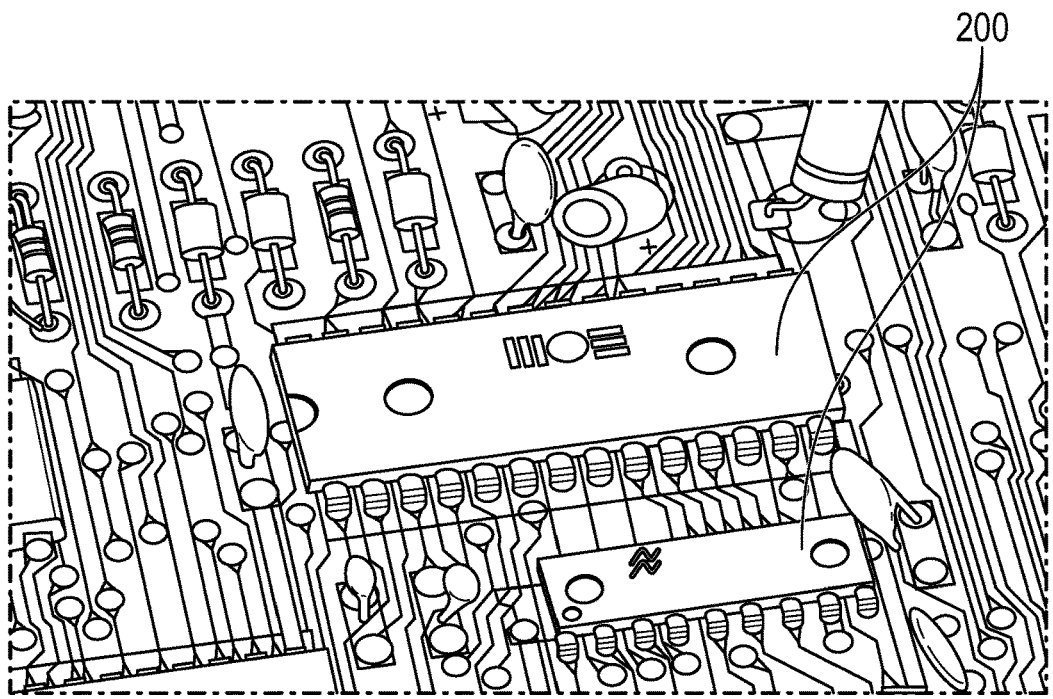
FIG. 2 is a perspective view of an illustrative printed circuit board (PCB) including integrated circuits.

In another embodiment, the fluoropolymer (e.g. photoresist) layer can be disposed upon a metal (e.g. copper) substrate in the manufacture of a printed circuit board (PCB). An illustrative perspective view of a printed circuit board is depicted in FIG. 2. A printed circuit board, or PCB, is used to mechanically support and electrically connect electronic components using conductive pathways, tracks or signal traces etched from (e.g. copper) metal sheets laminated onto a non-conductive substrate. Such boards are typically made from an insulating material such as glass fiber reinforced (fiberglass) epoxy resin or paper reinforced phenolic resin. The pathways for electricity are typically made from a negative photoresist, as previously described. Thus, in this embodiment, the crosslinked fluoropolymer is disposed on the surface of the (e.g. copper) metal substrate. Portions of uncrosslinked fluoropolymer are removed to form the conductive (e.g. copper) pathways. Crosslinked fluoropolymer (e.g. photoresist) remain present, disposed between the conductive (e.g. copper) pathways of the printed circuit board. Solder is used to mount components on the surface of these boards. In some embodiments, the printed circuit board further comprises integrated circuits 200, as depicted in FIG. 2. Printed circuit board assemblies have an application in almost every electronic article including computers, computer printers, televisions, and cell phones.

In another embodiment, the crosslinked fluoropolymer film described herein can be utilized as an insulating layer, passivation layer, and/or protective layer in the manufacture of integrated circuits.

Figure 3A:
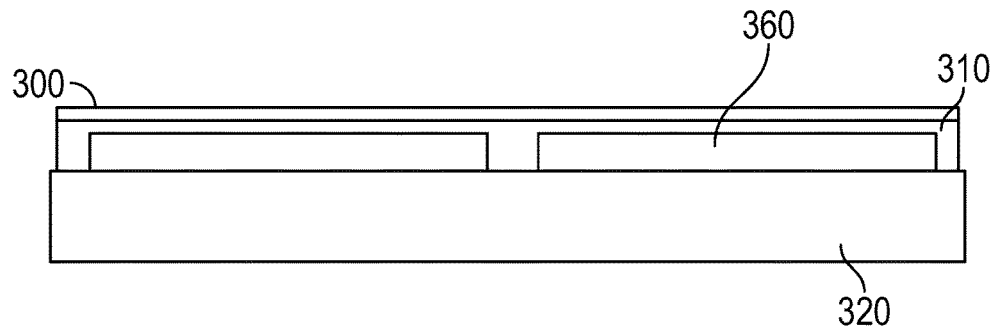
FIGS. 3A and 3B are cross-sectional diagrams of illustrative fluoropolymer passivation and insulating layers.

With reference to FIG. 3A, in one embodiment, a thin fluoropolymer film 300 (e.g. typically having a thickness less than 50, 40, or 30 nm) can be disposed on a passivation layer 310 (e.g. $SiO_2$) disposed on an electrode patterned 360 silicon chip 320.

Figure 3B:
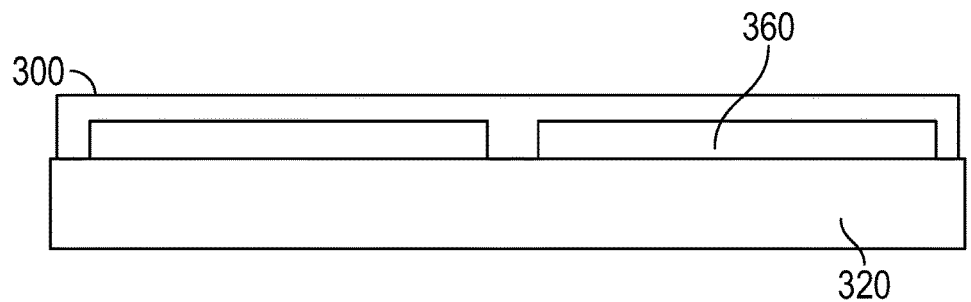

With reference to FIG. 3B, in another embodiment, a thicker fluoropolymer film 300 (e.g. typically having a thickness of at least 100, 200, 300, 400, 500 nm) can be disposed on an electrode patterned 360 silicon chip 320. In this embodiment, the fluoropolymer layer may function as both a passivation layer and an insulating layer. Passivation is the use of a thin coating to provide electrical stability by isolating the transistor surface from electrical and chemical conditions of the environment.

In another embodiment, the crosslinked fluoropolymer film described herein can be utilized as a substrate for antennas. The antenna of the transmitter emits (e.g. high frequency) energy into space while the antenna of the receiver catches this and converts it into electricity.

Figure 4:
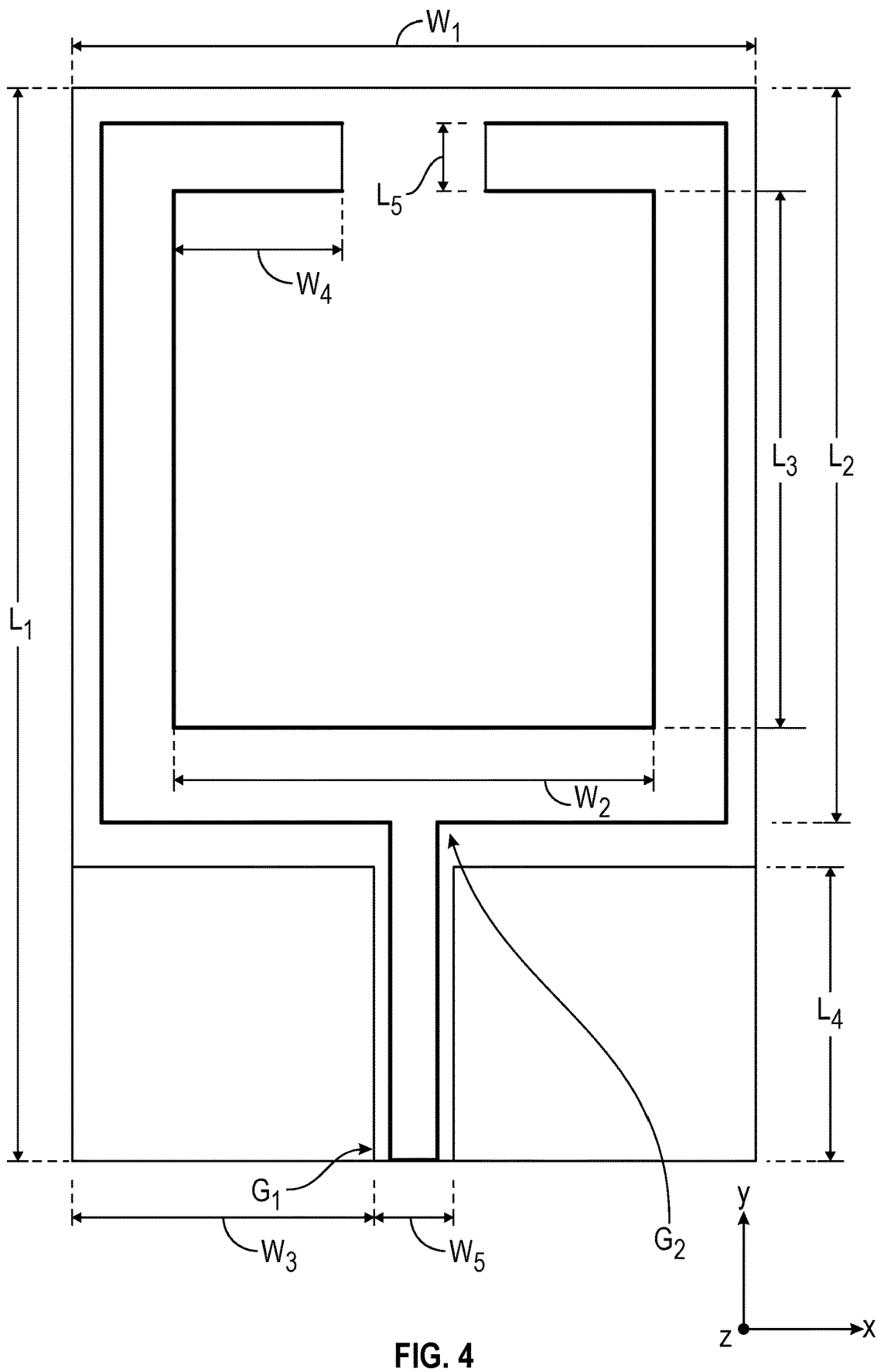
FIG. 4 is a plan view of an illustrative antenna of a mobile computer device.

The patterned electrodes of an antenna can also be formed from photolithography. Screen printing, flexography, and ink jet printing can also be utilized to form the electrode pattern as known in the art. Various antenna designs for (e.g. mobile) computing devices (smart phone, tablet, laptop, desktop) have been described in the literature. One representative split ring monopole antenna is depicted in FIG. 4 having the following dimensions in microns.

| L1 | 38  | W1 | 25   |
|----|-----|----|------|
| L2 | 26  | W2 | 18   |
| L3 | 19  | W3 | 10.5 |
| L4 | 9.5 | W4 | 6.5  |
| L5 | 3   | W5 | 2    |
| G1 | 2   | G2 | 0.5  |

Figure 5A:
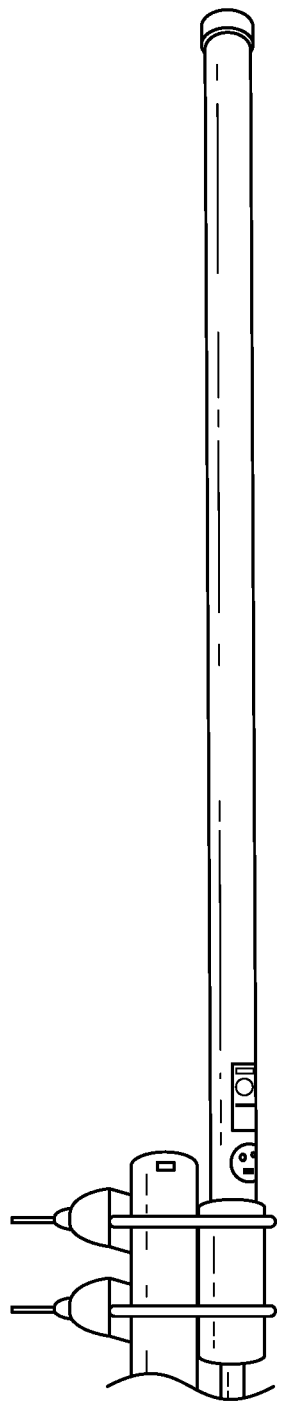
FIGS. 5A and 5B are perspective views of illustrative antennas of a telecommunications tower.
Figure 5B:
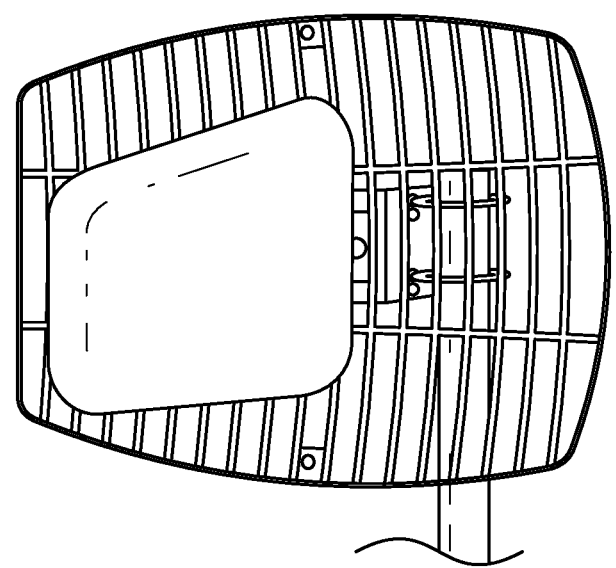

The low dielectric fluoropolymer films and coatings described herein can also be utilized as insulating and protective layers of transmitter antennas of cell towers and other (e.g. outdoor) structures. There are two major types of antennas used in cell towers. FIG. 5A is depicts a representative omnidirectional (e.g. dipole) antenna used to transmit/receive in any direction. FIG. 5B is a representative directional antenna used to transmit/receive in particular desired direction only such as horn antennas of circular and rectangular type.

Figure 6:
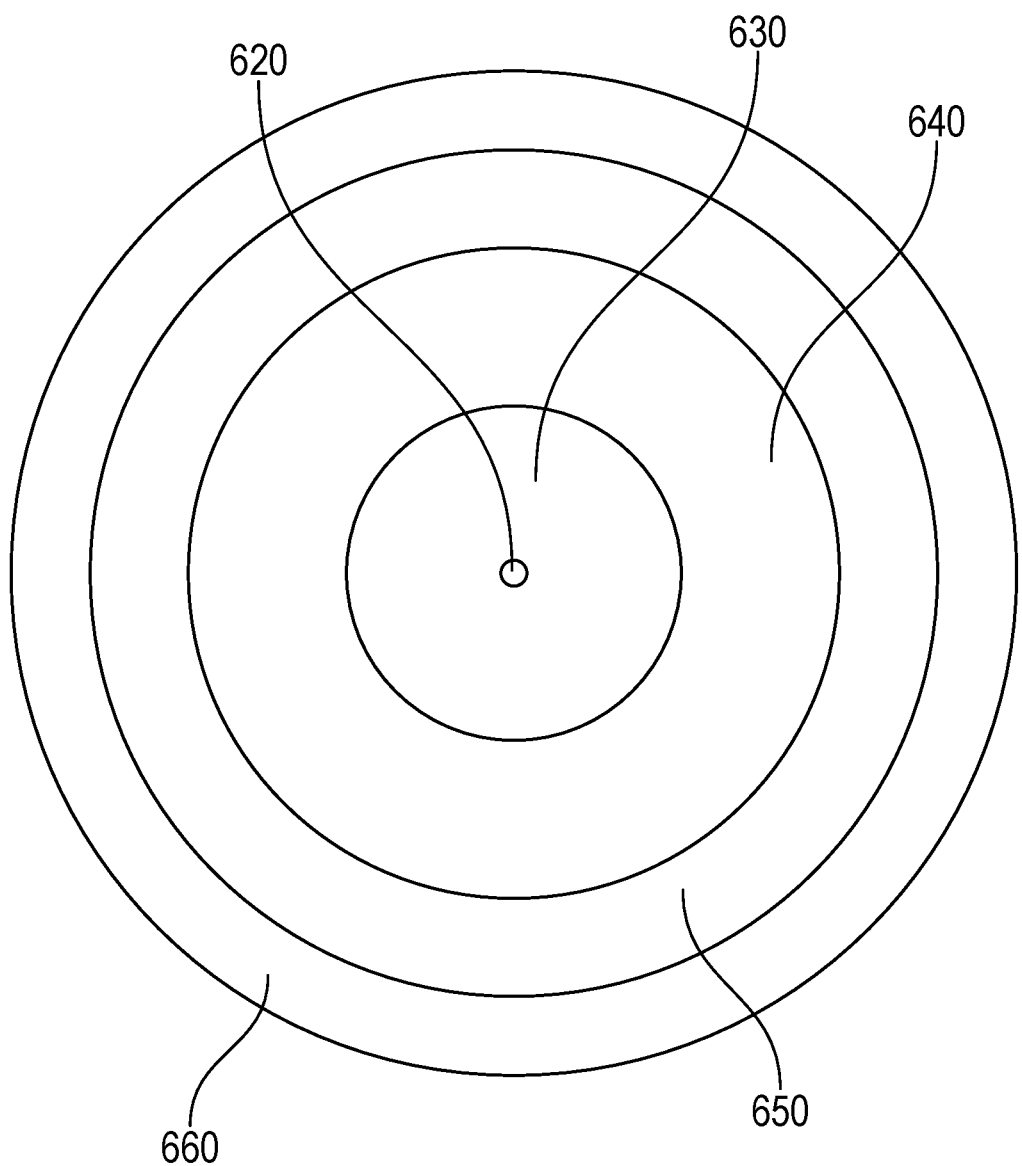
FIG. 6 is a cross-sections diagram of an illustrative optical fiber cable.

In another embodiment, the low dielectric fluoropolymer compositions described herein may also be utilized in fiber optic cable. With reference to FIG. 6, fiber optic cable typically includes five main components: the core which is typically highly pure (e.g. silica) glass 620, cladding 630, coating (e.g, first inner protective layer) 640, strengthening fibers 650, and outer jacket (i.e. second outer protective layer) 660. The function of the cladding is to provide a lower refractive index at the core interface in order to cause reflection within the core so that light waves are transmitted through the fiber. The coating over the cladding is typically present to reinforce the fiber core, help absorb shocks, and provide extra protection against excessive cable bends. The low dielectric fluoropolymer compositions described herein can be used as the cladding, coating, outer jacket, or combination thereof.

In other embodiments, the low dielectric fluoropolymer films and coatings described herein can also be utilized for flexible cables and as an insulating film on magnet wire. For example, in a laptop computer, the cable that connects the main logic board to the display (which must flex every time the laptop is opened or closed) may be a low dielectric fluoropolymer composition as described herein with copper conductors.

The electronic telecommunication article is typically not a sealing component of equipment used in wafer and chip production.

One of ordinary skill in the art appreciates that the low dielectric fluoropolymer compositions described herein can be utilized in various electronic telecommunication articles, particularly in place of polyimide, and such utility is not limited to the specific articles described herein.

The fluoropolymers described herein are copolymers that comprise predominantly, or exclusively, (e.g. repeating) polymerized units derived from two or more perfluorinated comonomers. Copolymer refers to a polymeric material resulting from the simultaneous polymerization of two or more monomers. In some embodiments, the comonomers include tetrafluoroethene (TFE) and one or more unsaturated perfluorinated (e.g. alkenyl, vinyl) alkyl ethers.

In some favored embodiments, the one or more unsaturated perfluorinated alkyl ethers are selected from the general formula:

$$R_f-O-(CF_2)_n-CF=CF_2$$

wherein n is 1 (allyl ether) or 0 (vinyl ether) and $R_f$ represents a perfluoroalkyl residue which may be interrupted once or more than once by an oxygen atom. $R_f$ may contain up to 10 carbon atoms, e.g. 1, 2, 3, 4, 5, 6, 7, 8, 9 or 10 carbon atoms. Preferably $R_f$ contains up to 8, more preferably up to 6 carbon atoms and most preferably 3 or 4 carbon atoms. In one embodiment $R_f$ has 3 carbon atoms. In another embodiment $R_f$ has 1 carbon atom. $R_f$ may be linear or branched, and it may contain or not contain a cyclic unit. Specific examples of $R_f$ include residues with one or more ether functions including but not limited to:

$$-(CF_2)-O-C_3F_7,$$

$$-(CF_2)_2-O-C_2F_5,$$

$$-(CF_2)_{r\text{-}3}-O-CF_3,$$

$$-(CF_2-O)-C_3F_7,$$

$$-(CF_2-O)_2-C_2F_5,$$

$$-(CF_2-O)_3-CF_3,$$

$$-(CF_2CF_2-O)-C_3F_7,$$

$$-(CF_2CF_2-O)_2-C_2F_5,$$

$$-(CF_2CF_2-O)_3-CF_3,$$

Other specific examples for $R_f$ include residues that do not contain an ether function and include but are not limited to $-C_4F_9$, $-C_3F_7$, $-C_2F_5$, $-CF_3$, wherein the $C_4$ and $C_3$ residues may be branched or linear, but preferably are linear.

Specific examples of suitable perfluorinated alkyl vinyl ethers (PAVE's) and perfluorinated alkyl allyl ethers (PAAE's) include but are not limited to perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_2=CF-O-CF_2-O-C_2F_5$, $CF_2=CF-O-CF_2-O-C_3F_7$, $CF_3-(CF_2)_2-O-CF(CF_3)-CF_2-O-CF(CF_3)-CF_2-O-CF=CF_2$ and their allyl ether homologues. Specific examples of allyl ethers include $CF_2=CF-CF_2-O-CF_3$, $CF_2=CF-CF_2-O-C_3F_7$, $CF_2=CF-CF_2-O-(CF_3)_3-O-CF_3$.

Further examples include but are not limited to the vinyl ether described in European patent application EP 1,997,795 B1.

Perfluorinated ethers as described above are commercially available, for example from Anles Ltd., St. Petersburg, Russia and other companies or may be prepared according to methods described in U.S. Pat. No. 4,349,650 (Krespan) or European Patent 1,997,795, or by modifications thereof as known to a skilled person.

In some embodiments, the one or more unsaturated perfluorinated alkyl ethers comprises unsaturated cyclic perfluorinated alkyl ethers, such as 2,2-bistrifluoromethyl-4,5-difluoro-1,3 dioxole. In other embodiments, the fluoropolymer is substantially free of unsaturated cyclic perfluorinated alkyl ethers, such as 2,2-bistrifluoromethyl-4,5-difluoro-1,3 dioxole. By substantially free it is meant that the amount is zero or sufficiently low such the fluoropolymer properties are about the same.

In some favored embodiments, the fluoropolymers are derived predominantly or exclusively from perfluorinated comonomers including tetrafluoroethene (TFE) and one or more of the unsaturated perfluorinated alkyl ethers described above. "Predominantly" as used herein means at least 80, 85, or 90% by weight based on the total weight of the fluoropolymer, of the polymerized units of the fluoropolymer are derived from such perfluorinated comonomers such as tetrafluoroethene (TFE) and one or more unsaturated perfluorinated alkyl ethers. In some embodiments, the fluoropolymer comprises at least 81, 82, 83, 84, 85, 86, 87, 88, 90, 91, 92, 93, 94, 95, 96, or 97% by weight or greater of such perfluorinated comonomers, based on the total weight of the fluoropolymer. The fluoropolymers may contain at least 40, 45, or 50% by weight of polymerized units derived from TFE. In some embodiments, the maximum amount of polymerized units derived from TFE is no greater than 60% by weight.

The fluoropolymer typically comprises polymerized units derived from one or more of the unsaturated perfluorinated alkyl ethers (PAVE) (e.g. PMVE, PAAE or a combination thereof), in an amount of at least 10, 15, 20, 25, 30, 45, or 50% by weight, based on the total polymerized monomer units of the fluoropolymer. In some embodiments, the fluoropolymer comprises no greater than 50, 45, 40, or 35% by weight of polymerized units derived from one or more of the unsaturated perfluorinated alkyl ethers (PMVE, PAAE or a combination thereof), based on the total polymerized monomer units of the fluoropolymer. The molar ratio of units derived from TFE to the perfluorinated alkly ethers described above may be, for example, from 1:1 to 5:1. In some embodiments, the molar ratio ranges from 1.5:1 to 3:1.

The fluoropolymers may be thermoplastic but, in a preferred embodiment, the fluoropolymer is amorphous. As used herein, amorphous fluoropolymers are materials that contain essentially no crystallinity or possess no significant melting point (peak maximum) as determined by differential scanning calorimetry in accordance with DIN EN ISO 11357-3:2013-04 under nitrogen flow and a heating rate of 10° C./min. Typically, amorphous fluoropolymers have a glass transition temperature (Tg) of less than 26° C., less than 20° C., or less than 0° C., and for example from −40° C. to 20° C., or −50° C. to 15° C., or −55° C. to 10° C. The fluoropolymers may typically have a Mooney viscosity (ML 1+10 at 121° C.) of from about 2 to about 150, for example from 10 to 100, or from 20 to 70. For amorphous polymers containing cyclic perfluorinated alky ether units, the glass transition temperature is typically at least 70° C., 80° C., or 90° C., and may range up to 220° C., 250° C., 270° C., or 290° C. The MFI (297° C./5 kg) is between 0.1-1000 g/10 min.

In other embodiments, the fluoropolymer may have a melt point of less than 150° C. or 100° C.

The fluoropolymer is preferably a curable fluoropolymer that contains one or more cure sites. Cure sites are functional groups that react in the presence of a curing agent or a curing system to cross-link the polymers. The cure sites are typically introduced by copolymerizing cure-site monomers, which are functional comonomers already containing the cure sites or precursors thereof. One indication of crosslinking is that the dried and cured coating composition was not soluble in the fluorinated solvent of the coating.

The cure sites may be introduced into the polymer by using cure site monomers, i.e. functional monomers as will be described below, functional chain-transfer agents and starter molecules. The fluoroelastomers may contain cure sites that are reactive to more than one class of curing agents.

The curable fluoroelastomers may also contain cure sites in the backbone, as pendent groups, or cure sites at a terminal position. Cure sites within the fluoropolymer backbone can be introduced by using a suitable cure-site monomer. Cure site monomers are monomers containing one or more functional groups that can act as cure sites or contain a precursor that can be converted into a cure site.

In some embodiments, the cure sites comprise iodine or bromine atoms.

Iodine-containing cure site end groups can be introduced by using an iodine-containing chain transfer agent in the polymerization. Iodine-containing chain transfer agents will be described below in greater detail. Halogenated redox systems as described below may be used to introduce iodine end groups.

In addition to iodine cures sites, other cure sites may also be present, for example Br-containing cure sites or cure sites containing one or more nitrile groups. Br-containing cure sites may be introduced by Br-containing cure-site monomers.

Examples of cure-site comonomers include for instance:
(a) bromo- or iodo-(per)fluoroalkyl-(per)fluorovinylethers, for example including those having the formula:

wherein each X may be the same or different and represents H or F, Z is Br or I, Rf is a C1-C12 (per)fluoroalkylene, optionally containing chlorine and/or ether oxygen atoms. Suitable examples include $ZCF_2$—O—$CF$=$CF_2$, $ZCF_2CF_2$—O—$CF$=$CF_2$, $ZCF_2CF_2CF_2$—O—$CF$=$CF_2$, $CF_3CFZCF_2$—O—$CF$=$CF_2$ or $ZCF_2CF_2$—O—$CF_2CF_2CF_2$—O—$CF$=$CF_2$ wherein Z represents Br of I; and (b) bromo- or iodo perfluoroolefins such as those having the formula:

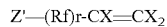

wherein each X independently represents H or F, Z' is Br or I, Rf is a $C_1$-$C_{12}$ perfluoroalkylene, optionally containing chlorine atoms and r is 0 or 1; and (c) non-fluorinated bromo and iodo-olefins such as vinyl bromide, vinyl iodide, 4-bromo-1-butene and 4-iodo-1-butene.

Specific examples include but are not limited to compounds according to (b) wherein X is H, for example compounds with X being H and Rf being a C1 to C3 perfluoroalkylene. Particular examples include: bromo- or iodo-trifluoroethene, 4-bromo-perfluorobutene-1,4-iodo-perfluorobutene-1, or bromo- or iodo-fluoroolefins such as 1-iodo,2,2-difluroroethene, 1-bromo-2,2-difluoroethene, 4-iodo-3,3,4,4-tetrafluorobutene-1 and 4-bromo-3,3,4,4-tetrafluorobutene-1; 6-iodo-3,3,4,4,5,5,6,6-octafluorohexene-1.

In some embodiments, the cure sites comprise chlorine atoms. Such cure-site monomers include those of the general formula: $CX_1X_2$=$CY_1Y_2$ where $X_1$, $X_2$ are independently H and F; $Y_1$ is H, F, or Cl; and $Y_2$ is Cl, a fluoroalkyl group ($R_F$) with at least one Cl substituent, a fluoroether group ($OR_F$) with at least one Cl substituent, or —$CF_2$—$OR_F$. The fluoroalkyl group ($R_F$) is typically a partially or fully fluorinated $C_1$-$C_5$ alkyl group. Examples of cure-site monomer with chlorine atoms include $CF_2$=$CFCl$, $CF_2$=$CF$—$CF_2Cl$, $CF_2$=$CF$—O—$(CF_2)_n$—Cl, n=1-4; $CH_2$=$CHCl$, $CH_2$=$CCl_2$.

Typically, the amount of iodine or bromine or chlorine or their combination in the fluoropolymer is between 0.001 and 5%, preferably between 0.01 and 2.5%, or 0.1 to 1% or 0.2 to 0.6% by weight with respect to the total weight of the fluoropolymer. In one embodiment the curable fluoropolymers contain between 0.001 and 5%, preferably between 0.01 and 2.5%, or 0.1 to 1%, more preferably between 0.2 to 0.6% by weight of iodine based on the total weight of the fluoropolymer.

The composition may optionally further comprise a second fluoropolymer that lacks halogen cure sites. The amount of fluoropolymer lacking halogen cure sites is typically less than 50, 45, 40, 35, 30, 25, 20, 15, 10, or 5 wt. % of the total fluoropolymer. Thus, the composition has a sufficient amount of fluoropolymer with halogen cure sites such that adequate crosslinking is achieved.

In one embodiments, the composition further comprises a second fluoropolymer derived predominantly, or exclusively from two or more perfluorinated comonomers including tetrafluoroethene (TFE) and one or more unsaturated cyclic perfluorinated alkyl ethers, such as 2,2-bistrifluoromethyl-4,5-difluoro-1,3 dioxole. Such fluoropolymers are commercially available as "TEFLON™ AF", "CYTOP™", and "HYFLON™".

In some embodiments, the second fluoropolymer contains nitrile-containing cure sites. When a combination of fluoropolymers with different cure site is utilized the composition may be characterized as a dual curing, containing different cure sites that are reactive to different curing systems.

Although fluoropolymer with halogen cure sites (iodine, bromine, and chlorine) are favored for UV curing, in the case of thermal or e-beam curing; fluoropolymers with nitrile-containing cure cites can alternatively be employed.

Fluoropolymers with nitrile-containing cure sites are known, such as described in U.S. Pat. No. 6,720,360.

Nitrile-containing cure sites may be reactive to other cure systems for example, but not limited to, bisphenol curing systems, peroxide curing systems, triazine curing systems, and especially amine curing systems. Examples of nitrile containing cure site monomers correspond to the following formulae:

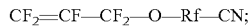

$CF_2=CF-CF_2-O-Rf-CN;$

$CF_2=CFO(CF_2)_rCN;$

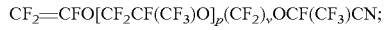

$CF_2=CFO[CF_2CF(CF_3)O]_p(CF_2)_vOCF(CF_3)CN;$

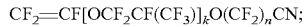

$CF_2=CF[OCF_2CF(CF_3)]_kO(CF_2)_nCN;$ wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include but are not limited to perfluoro (8-cyano-5-methyl-3,6-dioxa-1-octene), $CF_2=CFO(CF_2)_5CN$, and $CF_2=CFO(CF_2)_3OCF(CF_3)CN$.

In some embodiments, the amount of nitrile-containing cure site comonomer is typically at least 0.5, 1, 1.5, 2, 2.5, 3, 3.5, 4, 4.5 or 5% by weight and typically no greater than 10% by weight; based on the total weight of the fluoropolymer. Suitable curing agents for nitrile cure sites are known in the art and include, but are not limited to (e.g. fluorinated) amidines, amidoximes and others described in WO2008/094758 A1, incorporated herein by reference. Representative curing agents include for example bis-tetraphosphonium perfluoroadipate, methyl sulfone, tetrabutyl phosphonium toluy-hexafluoroisopropoxyde trifluoromethoxy, and tetrafluoropropyl amidine.

In one embodiment, the fluoropolymer with nitrile-containing cure sites can be combined with a peroxide and ethylenically unsaturated compound as curing agents as described in WO 2018/107017. In this embodiments, suitable organic peroxides are those which generate free radicals at curing temperatures. Examples include dialkyl peroxides or bis(dialkyl peroxides), for example. a di-tertiarybutyl peroxide having a tertiary carbon atom attached to the peroxy oxygen. Specific examples include 2,5-dimethyl-2, 5-di(tertiarybutylperoxy)hexyne-3 and 2,5-dimethyl-2,5-di(tertiarybutylperoxy)hexane; dicumyl peroxide, dibenzoyl peroxide, tertiarybutyl perbenzoate, alpha,alpha'-bis(t-butylperoxy-diisopropylbenzene), and di[1,3-dimethyl-3-(t-butylperoxy)-butyl]carbonate. Generally, about 1 to 5 parts of peroxide per 100 parts of fluoropolymer may be used.

In other embodiments, the composition is substantially free of fluoropolymer with nitrile-containing cure sites. In this embodiment, the composition is also free of curing agents that react with nitrile groups.

In other embodiments, halogenated chain transfer agents can be utilized to provide terminal cure sites. Chain transfer agents are compounds capable of reacting with the propagating polymer chain and terminating the chain propagation. Examples of chain transfer agents reported for the production of fluoroelastomers include those having the formula $RI_x$, wherein R is an x-valent fluoroalkyl or fluoroalkylene radical having from 1 to 12 carbon atoms, which, may be interrupted by one or more ether oxygens and may also contain chlorine and/or bromine atoms. R may be Rf and Rf may be an x-valent (per)fluoroalkyl or (per)fluoroalkylene radical that may be interrupted once or more than once by an ether oxygen. Examples include alpha-omega diiodo alkanes, alpha-omega diiodo fluoroalkanes, and alpha-omega diiodoperfluoroalkanes, which may contain one or more catenary ether oxygens. "Alpha-omega" denotes that the iodine atoms are at the terminal positions of the molecules. Such compounds may be represented by the general formula X—R—Y with X and Y being I and R being as described above. Specific examples include di-iodomethane, alpha-omega (or 1,4-) diiodobutane, alpha-omega (or 1,3-) diiodopropane, alpha-omega (or 1,5-) diiodopentane, alpha-omega (or 1,6-) diiodohexane and 1,2-diiodoperfluoroethane. Other examples include fluorinated di-iodo ether compounds of the following formula:

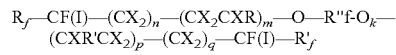

$R_f—CF(I)—(CX_2)_n—(CX_2CXR)_m—O—R''f-O_k— $
$(CXR'CX_2)_p—(CX_2)_q—CF(I)—R'_f$ wherein X is independently selected from F, H, and Cl; $R_f$ and $R'_f$ are independently selected from F and a monovalent perfluoroalkane having 1-3 carbons; R is F, or a partially fluorinated or perfluorinated alkane comprising 1-3 carbons; $R''_f$ is a divalent fluoroalkylene having 1-5 carbons or a divalent fluorinated alkylene ether having 1-8 carbons and at least one ether linkage; k is 0 or 1; and n, m, and p are independently selected from an integer from 0-5, wherein, n plus m at least 1 and p plus q are at least 1.

The fluoropolymers may or may not contain units derived from at least one modifying monomer. The modifying monomers may introduce branching sites into the polymer architecture. Typically, the modifying monomers are bisolefins, bisolefinic ethers or polyethers. The bisolefins and bisolefinic (poly)ethers may be perfluorinated, partially fluorinated or non-fluorinated. Preferably they are perfluorinated. Suitable perfluorinated bisolefinic ethers include those represented by the general formula:

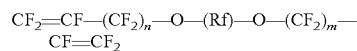

$CF_2=CF—(CF_2)_n—O—(Rf)—O—(CF_2)_m—$
$CF=CF_2$ wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms. A particular suitable perfluorinated bisolefinic ether is a di-vinylether represented by the formula:

$CF_2=CF—O—(CF_2)_n—O—CF=CF_2$ wherein n is an integer between 1 and 10, preferably 2 to 6., e.g. n may be 1, 2, 3, 4, 5, 6 or 7. More preferably, n represents an uneven integer, for example 1, 3, 5 or 7.

Further specific examples include bisolefinic ethers according the general formula

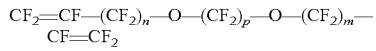

wherein n and m are independently either 1 or 0 and p is an integer from 1 to 10 or 2 to 6. For example, n may be selected to represent 1, 2, 3, 4, 5, 6 or 7, preferably, 1, 3, 5 or 7.

Further suitable perfluorinated bisolefinic ethers can be represented by the formula

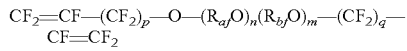

wherein $R_{af}$ and $R_{bf}$ are different linear or branched perfluoroalkylene groups of 1-10 carbon atoms, in particular, 2 to 6 carbon atoms, and which may or may not be interrupted by one or more oxygen atoms. $R_{af}$ and/or $R_{bf}$ may also be perfluorinated phenyl or substituted phenyl groups; n is an integer between 1 and 10 and m is an integer between 0 and 10, preferably m is 0. Further, p and q are independently 1 or 0.

In another embodiment, the perfluorinated bisolefinic ethers can be represented by the formula just described wherein m, n, and p are zero and q is 1-4.

Modifying monomers can be prepared by methods known in the art and are commercially available, for example, from Anles Ltd., St. Petersburg, Russia.

Preferably, the modifiers are not used or only used in low amounts. Typical amounts include from 0 to 5%, or from 0 to 1.4% by weight based on the total weight of the fluoropolymer. Modifiers may be present, for example, in amounts from about 0.1% to about 1.2% or from about 0.3% to about 0.8% by weight based on the total weight of fluoropolymer. Combinations of modifiers may also be used.

The fluoropolymers may contain partially fluorinated or non-fluorinated comonomers and combinations thereof, although this is not preferred. Typical partially fluorinated comonomers include but are not limited to 1,1-difluoroethene (vinylidenefluoride, VDF) and vinyl fluoride (VF) or trifluorochloroethene or trichlorofluoroethene. Examples of non-fluorinated comonomers include but are not limited to ethene and propene. The amount of units derived from these comonomers include from 0 to 8% by weight based on the total weight of the fluoropolymer. In some embodiments, the concentration of such comonomer is no greater than 7, 6, 5, 4, 3, 2, or 1% by weight based on the total weight of the fluoropolymer.

In a preferred embodiment, the curable fluoropolymer is a perfluoroelastomer that comprises repeating units (exclusively) derived from the perfluorinated comonomers but may contain units derived from cure-site monomers and modifying monomers if desired. The cure-site monomers and modifying monomers may be partially fluorinated, not fluorinated or perfluorinated, and preferably are perfluorinated. The perfluoroelastomers may contain from 69 to 73, 74, or 75% fluorine by weight (based on the total amount of perfluoroelastomer). The fluorine content may be achieved by selecting the comonomers and their amounts accordingly.

Such highly-fluorinated amorphous fluoropolymers typically do not dissolve to the extent of at least 1 wt. %, at room temperature and standard pressure, in a hydrogen-containing organic liquid (e.g., it does not dissolve in any of methyl ethyl ketone ("MEK"), tetrahydrofuran ("THF"), ethyl acetate or N-methyl pyrrolidinone ("NMP")).

The fluoropolymers can be prepared by methods known in the art, such as bulk, suspension, solution or aqueous emulsion polymerization. Various emulsifiers can be used as described in the art, including for example 3H-perfluoro-3-[(3-methoxy-propoxy)propanoic acid. For example, the polymerization process can be carried out by free radical polymerization of the monomers alone or as solutions, emulsions, or dispersions in an organic solvent or water. Seeded polymerizations may or may not be used. Curable fluoroelastomers that can be used also include commercially available fluoroelastomers, in particular perfluoroelastomers.

The fluoropolymers may have a monomodal or bi-modal or multi-modal weight distribution. The fluoropolymers may or may not have a core-shell structure. Core-shell polymers are polymers where towards the end of the polymerization, typically after at least 50% by mole of the comonomers are consumed, the comonomer composition or the ratio of the comonomers or the reaction speed is altered to create a shell of different composition.

The fluorine content of the fluoropolymer is typically at least 60, 65, 66, 67, 68, 69, or 70 wt. % of the fluoropolymer and typically no greater than 76, 75, 74, or 73 wt. %.

The fluoropolymer compositions described herein contain one or more ethylenically unsaturated curing agents. The ethylenically unsaturated curing agents are typically present in an amount of at least 1, 1.5, or 2 wt. % based on the total weight of the fluoropolymer. For compositions having a lower amount of crosslinking, the ethylenically unsaturated curing agents may be present at a lower amount such as at least 0.005, 0.1, 0.2, 0.3, 0.5 wt. %. The maximum amount of ethylenically unsaturated curing agents is typically no greater than 10, 9, 8, 7, 6, or 5 wt. % based on the total weight of the fluoropolymer.

The ethylenically unsaturated group(s) of the curing agent are typically (meth)acryl including (meth)acrylate RCH=CHCOO— and (meth)acrylamide RCH=CHCONH—, wherein R is methyl of hydrogen; alkenyl including vinyl (CH$_2$=CH—); or alkynyl.

Useful multi-(meth)acrylate curing agents include (a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing monomer such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

In some embodiments, the ethylenically unsaturated curing agent comprises at least two or three ethylenically unsaturated groups. The maximum number of ethylenically unsaturated groups is typically 3, 4, 5, or 6. In this embodiment, the ethylenically unsaturated groups are preferably alkenyl groups. Thus, the composition in some embodiments, the composition is substantially free of (meth)acrylate groups.

The ethylenically unsaturated curing agent may be linear, branched, or comprise a cyclic group. The ethylenically unsaturated curing agent may be aliphatic or aromatic. Examples of useful ethylenically unsaturated curing agents include triallyl cyanurate; triallyl isocyanurate; triallyl trimellitate; tri(methylallyl)isocyanurate; tris(diallylamine)-s-triazine; triallyl phosphite; (N,N')-diallyl acrylamide; hexaallyl phosphoramide; (N,N,N,N)-tetraalkyl tetraphthalamide; (N,N,N',N-tetraallylmalonamide; trivinyl isocyanurate; N,N'-m-phenylenebismaleimide; diallyl-phthalate and tri(5-norbornene-2-methylene)cyanurate. In some embodiments, the ethylenically unsaturated curing agent is heterocyclic such as in the case of triallyl isocyanurate (TAIC).

In some embodiments, the ethylenically unsaturated curing agent comprises a silicone-containing moiety such as silane or siloxane. When the curing agent includes silicone-containing moiety, the curing agent can also promote adhesion of the fluoropolymer to a substrate.

Suitable ethylenically unsaturated curing agent that comprise silicone-containing moieties include for example diallyldimethylsilane; and 1,3-divinyltetramethyl disiloxane.

In some embodiment, the ethylenically unsaturated curing agent comprises at least one ethylenically unsaturated group and at least one alkoxy silane group. Suitable curing agents include for example (meth)acryloy alkoxy silanes such as 3-(methacryloxy)propyltrimethoxysilane, 3-(methacryloxy)propylmethyldimethoxysilane, 3-(acryloyloxypropyl)methyl dimethoxysilane, 3-(methacryloyloxy)propyldimethylmethoxysilane, and 3-(acryloxypropyl) dimethylmethoxysilane. In some embodiments, the amount of (meth)acryloy alkoxy silanes is at least 2, 3, 4, or 5 wt. % to achieve a highly crosslinked fluoropolymer.

Suitable alkenyl alkoxy silanes include vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, and allyltriethoxysilane.

In some embodiments, the ethylenically unsaturated curing agent may have the general formula

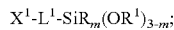

X¹-L¹-SiR$_m$(OR¹)$_{3-m}$;

wherein X¹ is an ethylenically unsaturated group, such as (meth)acryl or vinyl;
L¹ is an organic divalent linking group having 1 to 12 carbon atoms;
R is independently $C_1$-$C_4$ alkyl and most typically methyl or ethyl;
R¹ is independently H or $C_1$-$C_4$ alkyl and most typically methyl or ethyl; and
m ranges from 0 to 2.

In typical embodiments, L¹ is an alkylene group. In some embodiments, L¹ is an alkylene group having 1, 2 or 3 carbon atoms. In other embodiments, L¹ comprises or consists of an aromatic group such as phenyl or (e.g. $C_1$-$C_4$) alkyl phenyl.

The composition may comprise a single ethylenically unsaturated curing agent as just described or combinations of ethylenically unsaturated curing agents.

The composition described herein further comprises an electron donor group or precursor thereof. The electron donor group may be present on the same compound such as in the case of an aminoalkene or vinylaniline or the electron donor group may be present as a separate compound.

The fluoropolymer and/or the curing agent(s) comprise a chromophore, i.e. an atom or group that absorbs light at a specified frequency. In some embodiments, the fluororpolymer and/or curing agent may not have sufficient absorbance independently, but have sufficient absorbance in combination with each other.

In some embodiments, the fluoropolymer, curing agent(s), or combination, thereof have an absorbance of at least 0.1, 0.2, 0.3, 0.4, 0.5, 0.6, 0.7, 0.8, 0.9, or 1.0 at wavelength ranging from 190 nm to 400 nm. In some embodiments, such absorbance is at wavelength of at least 200 nm, 210 nm, 220 nm, 230 nm or 240 nm. In some embodiments, such absorbance is at wavelength of no greater than 350, 340, 330, 320, 310 nm, or 290 nm. In other embodiments, the fluoropolymer, curing agent(s), or combination, thereof have an absorbance of at least 0.1, 0.2, 0.3, 0.4, 0.5, 0.6, 0.7, 0.8, 0.9, or 1.0 at wavelength ranging from 150 nm to 200 nm.

Without intending to be bound by theory, it is surmised that upon exposure to suitable wavelengths and intensities of actinic (e.g. UV) radiation the halogen atoms of the cure sites of the fluoropolymer become excited and ionize. The ionized halogen atoms react with the electron donor group rendering protonated cure sites in place of the former halogen atoms. Such protonated cure site covalently bond with the ethylenically unsaturated group(s) of the curing agent.

Although other electron donor groups could be utilized, the compound comprising an electron donor group is typically an amine, or precursor thereof. Suitable amines include primary amine, secondary amines, teritiary amines, and combinations thereof. The amine may be aliphatic or aromatic. Amine compounds can also be utilized to provide a crosslinked fluoropolymer layer by (e.g. thermally) curing a fluoropolymer with (e.g. nitrile) cure sites utilizing an amine cuing agent.

Illustrative amine compounds include diamino hexane, N,N,N',N'-tetramethyl-1,4-diamino butane (TMDAB); N,N-dimethyl aniline; triethylenetetramine; and diethylenetriamine. In some embodiments, the amine groups are spaced apart by an alkylene group having at least 3, 4, 5, or 6 (e.g. carbons) atoms. Typically, the number of (e.g. carbon) atoms is no greater than 12. When the amine compound has an insufficient chain length, it can be a less effective electron donor group. The alkylene group can optionally comprise substituents, such as siloxane, provided the compound is an electron donor or precursor thereof.

In some embodiments, the electron donor compound may be characterized as an electron donor precursor meaning that when the compound is initially combined with the fluoropolymer it is not an electron donor. However, the precursor compound decomposes or otherwise reacts to form an (e.g. amine) electron donor prior to or during curing.

Electron donor precursors include nitrogen-containing nucleophilic compounds such as heterocyclic secondary amines; guanidines; compounds which decompose in-situ at a temperature between 40° C. and 330° C. to produce a guanidine; compounds which decompose in-situ at a temperature between 40° C. and 330° C. to produce a primary or secondary amine; nucleophilic compounds of the formula $R_1$—NH—$R_2$, wherein $R_1$ is H—, a $C_1$-$C_{10}$ aliphatic hydrocarbon group, or an aryl group having hydrogen atoms in the alpha positions, $R_2$ is a $C_1$-$C_{10}$ aliphatic hydrocarbon group, an aryl group having hydrogen atoms in the alpha positions, —CONH$R_3$, —NHCO$_2$$R_3$, or —OH', and $R_3$ is a $C_1$-$C_{10}$ aliphatic hydrocarbon group; and substituted amidines of the formula HN=C$R_4$N$R_5$$R_6$, wherein $R_4$, $R_5$, $R_6$ are independently H—, alkyl or aryl groups and wherein at least one of $R_4$, $R_5$ and Re is not H—.

As used herein, "heterocyclic secondary amine" refers to aromatic or aliphatic cyclic compound having at least one secondary amine nitrogen contained within the ring. Such compounds include, for example, pyrrole, imidazole, pyrazole, 3-pyrroline, and pyrrolidine.

Guanidines are compounds derived from guanidine, i.e. compounds which contain the radical, —NHCNHNH—, such as, but not limited to, diphenylguanidine, diphenylguanidine acetate, aminobutylguanidine, biguanidine, isopentylguanidine, di-o-tolylguanidine, o-tolylbiguanide, and triphenylguanidine.

Other compounds that decompose in-situ at a temperature between 40° C. and 330° C. to produce either a primary or secondary amine include, but are not limited to, di- or poly-substituted ureas (e.g. 1,3-dimethyl urea); N-alkyl or -dialkyl carbamates (e.g. N-(tert-butyloxycarbonyl)propylamine); di- or poly-substituted thioureas (e.g. 1,3-dimethyl-thiourea); aldehyde-amine condensation products (e.g. 1,3,5-trimethylhexahydro-1,3,5-triazine); N,N'-dialkyl phthalamide derivatives (e.g. N,N'-dimethylphthalamide); and amino acids.

When thermally activated electron donor precursor compounds are utilized as just described, the composition is typically heated prior to and/or during curing.

Other types of amine electron donor include bis(aminophenols) and bis(aminothiophenols) of the formulas

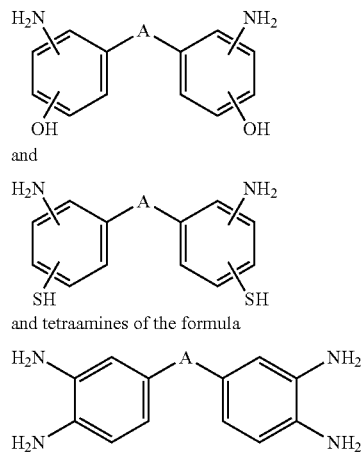

and tetraamines of the formula where A is SO$_2$, O, CO, alkyl of 1-6 carbon atoms, perfluoroalkyl of 1-10 carbon atoms, or a carbon-carbon bond linking the two aromatic rings. The amino and hydroxyl groups in the above formulas are interchangeably in the meta and para positions with respect to group A.

In some embodiments, the amine electron donor compound is an aziridine compound. In some embodiments, the aziridine compound comprises at least two aziridine groups.

The aziridine compound may comprise 3, 4, 5, 6, or greater than 6 aziridine groups. The aziridine compound may be represented by the following structure:

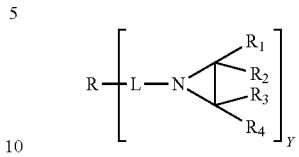

wherein R is a core moiety having a valency of Y;

L is a bond, divalent atom, or divalent linking group;

$R_1$, $R_2$, $R_3$, and $R_4$ are independently hydrogen or a $C_1$-$C_4$ alkyl (e.g. methyl); and Y is typically 2, 3, or greater.

In some embodiments, R is —SO$_2$—. In some embodiments, R-L is a residue of a multi(meth)acrylate compound. In some embodiments L is a $C_1$-$C_4$ alkylene, optionally substituted with one or more (e.g. contiguous or pendant) oxygen atoms thereby forming ether or ester linkages. In typical embodiments, $R_1$ is methyl and $R_2$, $R_3$, and $R_4$ are hydrogen.

Representative aziridine compounds include trimethylolpropane tri-[beta-(N-aziridinyl)-propionate, 2,2-bishydroxymethyl butanoltris[3-(1-aziridine) propionate]; 1-(aziridin-2-yl)-2-oxabut-3-ene; and 4-(aziridin-2-yl)-but-1-ene; and 5-(aziridin-2-yl)-pent-1-ene.

In some embodiments, a polyaziridine compound can be prepared by reacting divinyl sulfone with alkylene (e.g. ethylene) imine, such as described in U.S. Pat. No. 3,235, 544 (Christena). On representative compound is di(2-propyleniminoethyl)sulfone, as depicted as follows:

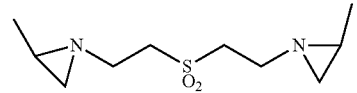

The above described polyaziridine compounds comprise at least two aziridine groups at the time the compound is added to the coating composition. In other embodiments, the polyaziridine compound does not comprise two aziridine groups at the time the compound is added to the composition, yet forms a polyaziridine in-situ. For example, compounds comprising a single aziridine group and a single (meth)acrylate group can form a dimer or oligomerize by reaction of the (meth)acrylate groups thereby forming a polyazirdine (i.e. diaziridine) compound.

In some embodiments, the composition comprises an electron donor compound comprising at least one (e.g. primary, secondary tertiary) amine group and at least one organosilane (e.g. alkoxy silane) group. Such compounds can improve bonding an independently crosslink the fluoroelastomers described herein, thereby providing a second fluoropolymer crosslinking mechanism. By use of ethylenically unsaturated curing agents in combination with amino-substituted organosilanes, highly crosslinked fluoropolymers can be provided utilizing lower concentrations of curing agents and electron donor compounds.

In some embodiments, the amine may be characterized as an amino-substituted organosilane ester or ester equivalent that bear on the silicon atom at least one, and preferably 2 or 3 ester or ester equivalent groups. Ester equivalents are known to those skilled in the art and include compounds such as silane amides (RNR'Si), silane alkanoates (RC(O)OSi), Si—O—Si, SiN(R)—Si, SiSR and RCONR'Si compounds that are thermally and/or catalytically displaceable by R"OH. R and R' are independently chosen and can include hydrogen, alkyl, arylalkyl, alkenyl, alkynyl, cycloalkyl, and substituted analogs such as alkoxyalkyl, aminoalkyl, and alkylaminoalkyl. R" may be the same as R and R', except it may not be H. These ester equivalents may also be cyclic such as those derived from ethylene glycol, ethanolamine, ethylenediamine (e.g. N-[3-(trimethoxylsilyl)propyl] ethylenediamine) and their amides.

Another such cyclic example of an ester equivalent is

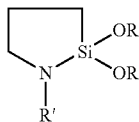

In this cyclic example R' is as defined in the preceding sentence, except that it may not be aryl. 3-aminopropyl alkoxysilanes are well known to cyclize upon heating, and these RNHSi compounds would be useful in this invention. Preferably the amino-substituted organosilane ester or ester equivalent has ester groups such as methoxy that are easily volatilized as methanol. The amino-substituted organosilane must have at least one ester equivalent; for example, it may be a trialkoxysilane.

For example, the amino-substituted organosilane may have the formula ($Z_2$N-L-SiX'X"X'"), wherein Z is hydrogen, alkyl, or substituted aryl or alkyl including amino-substituted alkyl; and L is a divalent straight chain C1-12 alkylene or may comprise a C3-8 cycloalkylene, 3-8 membered ring heterocycloalkylene, C2-12 alkenylene, C4-8 cycloalkenylene, 3-8 membered ring heterocycloalkenylene or heteroarylene unit; and each of X', X" and X'" is a C1-18 alkyl, halogen, C1-8 alkoxy, C1-8 alkylcarbonyloxy, or amino group, with the proviso that at least one of X', X", and X'" is a labile group. Further, any two or all of X', X" and X'" may be joined through a covalent bond. The amino group may be an alkylamino group.

L may be divalent aromatic or may be interrupted by one or more divalent aromatic groups or heteroatomic groups. The aromatic group may include a heteroaromatic. The heteroatom is preferably nitrogen, sulfur or oxygen. L is optionally substituted with C1-4 alkyl, C2-4 alkenyl, C2-4 alkynyl, C1-4 alkoxy, amino, C3-6 cycloalkyl, 3-6 membered heterocycloalkyl, monocyclic aryl, 5-6 membered ring heteroaryl, C1-4 alkylcarbonyloxy, C1-4 alkyloxycarbonyl, C1-4 alkylcarbonyl, formyl, C1-4 alkylcarbonylamino, or C1-4 aminocarbonyl. L is further optionally interrupted by —O—, —S—, —N(Rc)-, —N(Rc)-C(O)—, —N(Rc)-C(O)—O—, —O—C(O)—N(Rc)-, —N(Rc)-C(O)—N(Rd)-, —O—C(O)—, —C(O)—O—, or —O—C(O)—O—. Each of Rc and Rd, independently, is hydrogen, alkyl, alkenyl, alkynyl, alkoxyalkyl, aminoalkyl (primary, secondary or tertiary), or haloalkyl.

Examples of amino-substituted organosilanes include 3-aminopropyltrimethoxysilane (SILQUEST A-1110), 3-aminopropyltriethoxysilane (SILQUEST A-1100), bis(3-trimethoxysilylpropy)amine, bis(3-triethoxysilylpropy)amine, bis(3-trimethoxysilylpropy)n-methylamine, 3-(2-aminoethyl)aminopropyltrimethoxysilane (SILQUEST A-1120), SILQUEST A-1130, (aminoethylaminomethyl)phenethyltrimethoxysilane, (aminoethylaminomethyl)phenethyltriethoxysilane, N-(2-aminoethyl)-3-aminopropylmethyldimethoxysilane (SILQUEST A-2120), bis-(.gamma.-triethoxysilylpropyl)amine (SILQUEST A-1170), N-(2-aminoethyl)-3-aminopropyltributoxysilane, 6-(aminohexylaminopropyl)trimethoxysilane, 4-aminobutyltrimethoxysilane, 4-aminobutyltriethoxysilane, p-(2-aminoethyl)phenyltrimethoxysilane, 3-aminopropyltris(methoxyethoxyethoxy)silane, 3-aminopropylmethyldiethoxy-silane, oligomeric aminosilanes such as DYNASYLAN 1146, 3-(N-methylamino)propyltrimethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 3-aminopropylmethyldiethoxysilane, 3-aminopropylmethyldimethoxysilane, 3-aminopropyldimethylmethoxysilane, 3-aminopropyldimethylethoxysilane, and the following cyclic compounds:

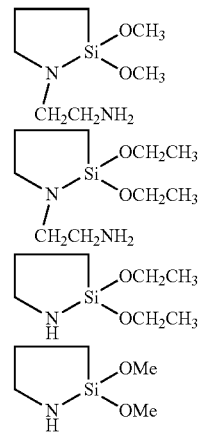

A bis-silyl urea [RO]$_3$Si(CH$_2$)NR]$_2$C=O is another example of an amino-substituted organosilane ester or ester equivalent.

In some embodiments, the curing agent may comprise an amino group having latent functionality. One example of such curing agent is a blocked amine group, such as

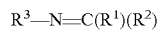

wherein $R^1$ and $R^2$ are independently selected from a linear or branched alkyl group comprising 1 to 6 carbon atoms. In typical embodiments R1 is methyl, and $R^2$ a linear or branched alkyl group comprising at least 2, 3, 4, 5, or 6 carbon atoms. $R^3$ is typically an organic group (e.g. having a molecular weight less than 500, 450, 400, 350, 300, or 250 g/mole).

The blocked amine can be activated by moisture provided by water adsorbed on the surface of the substrate being coated or from humidity. Deblocking begins in minutes and is generally complete within a few (e.g. two) hours. During deblocking the —N=C($R^1$)($R^2$) group is converted to —NH$_2$ that can then react with the (e.g. nitrile cure sites) of the fluoropolymer.

In some embodiments, the curing agent comprises a blocked amine group and an alkoxy silane group. Such blocked amine curing agent can be characterized by the following general formula:

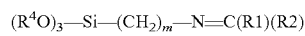

wherein $R^1$ and $R^2$ are independently selected from a linear or branched alkyl group comprising 1 to 6 carbon atoms as previously described. $R^1$ is independently selected from a linear or branched alkyl group comprising 1 to 6 carbon atoms, m is an integer from 1 to 4, and each $R^4$ is independently a C1 or C2 alkyl group.

One illustrative curing agent comprising a blocked amine group and an alkoxy silane group is N-(1,3-dimethylbutylidene)aminopropyl-triethoxysilane, depicted as follows:

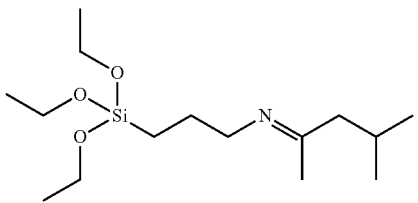 [SMILES: CCO[Si](CCC/N=C(\C)CC(C)C)(OCC)OCC]

Such curing agent is available from Gelest and from 3M as "3M™ Dynamer™ Rubber Curative RC5125". Blocked amines are additional examples of electron donor precursors.

In some embodiments, the amine curing agent comprises an aziridine group and an alkoxy silane group. Such compounds are known for examples from U.S. Pat. No. 3,243,429; incorporated herein by reference. Aziridine alkoxy silane compounds may have the general structure:

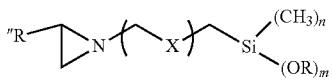

wherein R" is hydrogen or a $C_1$-$C_4$ alkyl (e.g. methyl);
X is a bond, a divalent atom, or a divalent linking group;
n is 0, 1 or 2;
m is 1, 2, or 3; and
and the sum or n+m is 3.

One representative compound is 3-(2-methylaziridinyl) ethylcarboxypropyltriethoxysilane.

Various other suitable aziridine crosslinkers are known, such as described in WO2014/075246; published May 22, 2014, incorporated herein by reference; and "NEW GENERATION OF MULTIFUNCTIONAL CROSSLINKERS," (See https://www.pstc.org/files/public/Milker00.pdf).

The composition comprises a single (e.g. amine) electron donor compound or a combination of amine electron donor compounds may be present.

The amount of (e.g. amine) electron donor compound is typically at least 0.01, 0.02, 0.03, 0.04, 0.05, 0.06, 0.07, 0.08, 0.09, 0.1, 0.2, 0.3, 0.4, or 0.5% by weight solids (i.e. excluding the solvent of the coating composition). In some embodiments, the amount of (e.g. amine) electron donor compound is no greater than 5, 4.5, 4, 3.5, or 3% by weight solids.

In some embodiments, the fluoropolymer composition further comprises an alkoxy silane compound that lacks amine functionality. In some embodiments, such alkoxy silanes may be characterized as "non-functional" having the chemical formula:

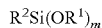

wherein $R^1$ is independently alkyl as previously described; $R^2$ is independently hydrogen, alkyl, aryl, alkaryl, or $OR^1$; and m ranges from 1 to 3, and is typically 2 or 3 as previously described.

Suitable alkoxy silanes of the formula $R^2Si(OR^1)_m$ include, but are not limited to tetra-, tri- or dialkoxy silanes, and any combinations or mixtures thereof. Representative alkoxy silanes include propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane dimethyldimethoxysilane and dimethyldiethoxysilane.

Preferably, the alkyl group(s) of the alkoxy silanes comprises from 1 to 6, more preferably 1 to 4 carbon atoms. Preferred alkoxysilanes for use herein are selected from the group consisting of tetra methoxysilane, tetra ethoxysilane, methyl triethoxysilane, dimethyldiethoxysilane, and any mixtures thereof. A preferred alkoxysilane for use herein comprises tetraethoxysilane (TEOS). The alkoxy silane lacking organofunctional groups utilized in the method of making the coating composition may be partially hydrolyzed, such as in the case of partially hydrolyzed tetramethoxysilane (TMOS) available from Mitsuibishi Chemical Company under the trade designation "MS-51".

When present, the amount of alkoxy silane compound that lacks (amine/electron donor) functionality (e.g. TESO) is typically at least 0.01, 0.02, 0.03, 0.04, 0.05, 0.06, 0.07, 0.08, 0.09, 0.1, 0.2, 0.3, 0.4, or 0.5% by weight solids (i.e. excluding the solvent of the coating composition). In some embodiments, the amount of alkoxy silane compound that lacks functionality is no greater than 5, 4.5, 4, 3.5, or 3% by weight solids.

In some embodiments, the composition described herein comprise a (e.g. UV) curing system comprising an ethylenically unsaturated compound in combination with an electron donor compound, such as an amine, in the absence of an organic peroxide. Organic peroxides are electron acceptors and thus would compete with the ionized halogen atom, thereby reducing crosslinking of the fluoropolymer. In some embodiments, the composition is also substantially free of other electron acceptors that would reduce crosslinking.

In other embodiments, an amino organosilane ester compound or ester equivalent can be utilized in the absence of an ethylenically unsaturated compound can be utilized to (e.g. UV) cure and/or thermally cure the fluoropolymer, as described in PCT/US2019/036460, incorporated herein by reference.

The fluoropolymer (coating solution) compositions comprises at least one solvent. The solvent is capable of dissolving the fluoropolymer. The solvent is typically present in an amount of at least 25% by weight based on the total weight of the coating solution composition. In some embodiments, the solvent is present in an amount of at least 30, 35, 40, 45, 50, 55, 60, 65, 70, 75, 80, 85, 90, 95% or greater based on the total weight of the coating solution composition.

The fluoropolymer (coating solution) composition typically comprises at least 0.01, 0.02, 0.03, 0.03, 0.04, 0.04, 0.05, 0.06, 0.7, 0.8, 0.9 or 1% by weight of fluoropolymer, based on the weight of the total coating solution composition. In some embodiments, the fluoropolymer coating solution composition comprises at least 2, 3, 4, or 5% by weight of fluoropolymer. In some embodiments, the fluoropolymer coating solution composition comprises at least 6, 7, 8, 9 or 10% by weight of fluoropolymer. The fluoropolymer coating solution composition typically comprises no greater than 50, 45, 40, 35, 30, 25, or 20% by weight of fluoropolymer, based on the weight of the total coating solution composition.

Optimum amounts of solvent and fluoropolymers may depend on the final application and may vary. For example, to provide thin coatings, very dilute solutions of fluoropolymer in the solvent may be desired, for example amounts of from 0.01% by weight to 5% by weight of fluoropolymer. Also for application by spray coating composition of low viscosity may be preferred over solutions with high viscosity. The concentration of fluoropolymer in the solution affects the viscosity and may be adjusted accordingly. An advantage of the present disclosure is that also solutions with high concentrations of fluoropolymer can be prepared that still provide clear liquid composition of low viscosity.

In some embodiments, the fluoropolymer coating solution compositions may be liquids. The liquids may have, for example, a viscosity of less than 2,000 mPas at room temperature (20° C.+/−2° C.). In other embodiments, the fluoropolymer coating solution compositions are pastes. The pastes may have, for example, a viscosity of from 2,000 to 100.000 mPas at room temperature (20° C.+/−2° C.).

The solvent is a liquid at ambient conditions and typically has a boiling point of greater than 50° C. Preferably, the solvent has a boiling point below 200° C. so that it can be easily removed. In some embodiments, the solvent has a boiling point below 190, 180, 170, 160, 150, 140, 130, 120, 110, or 100° C.

The solvent is partially fluorinated or perfluorinated. Thus, the solvent is non-aqueous. Various partially fluorinated or perfluorinated solvents are known including perfluorocarbons (PFCs), hydrochlorofluorocarbons (HCFCs), perfluoropolyethers (PFPEs), and hydrofluorocarbons (HFCs), as well as fluorinated ketones and fluorinated alkyl amines.

In some embodiments, the solvent has a global warming potential (GWP, 100 year ITH) of less than 1000, 900, 800, 700, 600, 500, 400, 300, 200 or 100. The GWP is typically greater than 0 and may be at least 10, 20, 30, 40, 50, 60, 70, or 80.

As used herein, GWP is a relative measure of the global warming potential of a compound based on the structure of the compound. The GWP of a compound, as defined by the Intergovernmental Panel on Climate Change (IPCC) in 1990 and updated in subsequent reports, is calculated as the warming due to the release of 1 kilogram of a compound relative to the warming due to the release of 1 kilogram of $CO_2$ over a specified integration time horizon (ITH).

$$GWP_x = \frac{\int_0^{ITH} F_x C_{xo} \exp(-t/\tau_x) dt}{\int_0^{ITH} F_{CO_2} C_{CO_2}(t) dt}$$

where F is the radiative forcing per unit mass of a compound (the change in the flux of radiation through the atmosphere due to the IR absorbance of that compound), $C_o$ is the atmospheric concentration of a compound at initial time, $\tau$ is the atmospheric lifetime of a compound, t is time, and x is the compound of interest.

In some embodiments, the solvent comprises a partially fluorinated ether or a partially fluorinated polyether. The partially fluorinated ether or polyether may be linear, cyclic or branched. Preferably, it is branched. Preferably it comprises a non-fluorinated alkyl group and a perfluorinated alkyl group and more preferably, the perfluorinated alkyl group is branched.

In one embodiment, the partially fluorinated ether or polyether solvent corresponds to the formula:

Rf—O—R wherein Rf is a perfluorinated or partially fluorinated alkyl or (poly)ether group and R is a non-fluorinated or partially fluorinated alkyl group. Typically, Rf may have from 1 to 12 carbon atoms. Rf may be a primary, secondary or tertiary fluorinated or perfluorinated alkyl residue. This means, when Rf is a primary alkyl residue the carbon atom linked to the ether atoms contains two fluorine atoms and is bonded to another carbon atom of the fluorinated or perfluorinated alkyl chain. In such case Rf would correspond to $R_f^1$—$CF_2$— and the polyether can be described by the general formula: $R_f^1$—$CF_2$—O—R.

When Rf is a secondary alkyl residue, the carbon atom linked to the ether atom is also linked to one fluorine atoms and to two carbon atoms of partially and/or perfluorinated alkyl chains and Rf corresponds to $(R_f^2 R_f^3)CF$—. The polyether would correspond to $(R_f^2 R_f^3)CF$—O—R.

When Rf is a tertiary alkyl residue the carbon atom linked to the ether atom is also linked to three carbon atoms of three partially and/or perfluorinated alkyl chains and Rf corresponds to $(R_f^4 R_f^5 R_f^6)$—C—. The polyether then corresponds to $(R_f^4 R_f^5 R_f^6)$—C—OR. $R_f^1$; $R_f^2$; $R_f^3$; $R_f^4$; $R_f^5$; $R_f^6$ correspond to the definition of Rf and are a perfluorinated or partially fluorinated alkyl group that may be interrupted once or more than once by an ether oxygen. They may be linear or branched or cyclic. Also a combination of polyethers may be used and also a combination of primary, secondary and/or tertiary alkyl residues may be used.

An example of a solvent comprising a partially fluorinated alkyl group includes $C_3F_7OCHFCF_3$ (CAS No. 3330-15-2).

An example of a solvent wherein Rf comprises a perfluorinated (poly)ether is $C_3F_7OCF(CF_3)CF_2OCHFCF_3$ (CAS No. 3330-14-1).

In some embodiments, the partially fluorinated ether solvent corresponds to the formula:

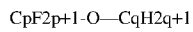

CpF2p+1-O—CqH2q+1 wherein q is an integer from 1 to and 5, for example 1, 2, 3, 4 or 5, and p is an integer from 5 to 11, for example 5, 6, 7, 8, 9, 10 or 11. Preferably, $C_pF_{2p+1}$ is branched. Preferably, $C_pF_{2p+1}$ is branched and q is 1, 2 or 3.

Representative solvents include for example 1,1,1,2,2,3, 4,5,5,5-decafluoro-3-methoxy-4-(trifluoromethyl)pentane and 3-ethoxy-1,1,1,2,3,4,4,5,5,6,6,6-dodecafluroro-2-(trifluoromethyl)hexane. Such solvents are commercially available, for example, under the trade designation NOVEC from 3M Company, St. Paul, Minn.

The fluorinated (e.g. ethers and polyethers) solvents may be used alone or in combination with other solvents, which may be fluorochemical solvents or non-fluorochemical solvents. When a non-fluorochemical solvent is combined with a fluorinated solvent, the concentration non-fluorochemical solvent is typically less than 30, 25, 20, 15, 10 or 5 wt-% with respect to the total amount of solvent. Representative non-fluorochemical solvents include ketones such as acetone, MEK, methyl isobutyl ketone, methyl amyl ketone and NMP; ethers such as tetrahydrofuran, 2-methyl tetrahydrofuran and methyl tetrahydrofurfuryl ether; esters such as methyl acetate, ethyl acetate and butyl acetate; cyclic esters such as delta-valerolactone and gamma-valerolactone.

In some embodiments, the composition further comprises crystalline fluoropolymer particles.

In one embodiment, such coating composition is prepared by blending a latex containing crystalline fluoropolymer particles with a latex containing amorphous fluoropolymer particles. The fluoropolymer particles typically have a small average particle diameter, for example less than 400 nm, but may be larger if especially when the applied coating will be rubbed after cure. For example, the fluoropolymer particle size range may be about 50 to about 1000 nm, or about 50 to about 400 nm, or about 50 to about 200 nm.

The latexes can be combined by any suitable manner such as by vortex mixing for 1-2 minutes. The method further comprises coagulating the mixture of latex particles. Coagulation may be carried out, for example, by chilling (e.g., freezing) the blended latexes or by adding a suitable salt (e.g., magnesium chloride). Chilling is especially desirable for coatings that will be used in semiconductor manufacturing and other applications where the introduction of salts may be undesirable. The method further comprising optionally washing the coagulated mixture of amorphous fluoropolymer particles and crystalline fluoropolymer particles. The washing step may substantially remove emulsifiers or other surfactants from the mixture and can assist in obtaining a well-mixed blend of substantially unagglomerated dry particles. In some embodiments, the surfactant level of the resulting dry particle mixture may, for example, be less than 0.1% by weight, less than 0.05% by weight or less than 0.01% by weight. The method further comprises drying the coagulated latex mixture. The coagulated latex mixture can be dried by any suitable means such as air drying or oven drying. In one embodiment, the coagulated latex mixture can be dried at 100° C. for 1-2 hours.

The dried coagulated latex mixture can be dissolved in a solvent suitable for dissolving the amorphous fluoropolymer particles to form a stable coating composition containing a homogeneous dispersion of the crystalline fluoropolymer particles in a solution of the amorphous fluoropolymer.

The coating solution can be utilized to provide a coating on a substrate by applying a layer of the coating composition to a surface of a substrates and drying (i.e. removing the fluorinated solvent by evaporation) the coating composition.

In some embodiments, the method further comprises rubbing (e.g. buffing, polishing) the dried layer thereby forming an amorphous fluoropolymer binder layer containing crystalline submicron fluoropolymer particles.

The submicron crystalline fluoropolymer particles at the coating surface forms a thin, continuous or nearly continuous fluoropolymer surface layer disposed on the underlying coating comprised of the amorphous fluoropolymer. In preferred embodiments the thin crystalline fluoropolymer layer is relatively uniformly smeared over the underlying coating and appears to be thinner and more uniform than might be the case if the fluoropolymer particles had merely undergone fibrillation (e.g., due to orientation or other stretching).

Average roughness (Ra) of the surface is the arithmetic average of the absolute values of the surface height deviation measured from the mean plane In some embodiments, Ra is at least 40 or 50 nm, ranging up to 100 nm before rubbing. In some embodiments, the surface after rubbing is at least 10, 20, 30, 40, 50 or 60% smoother. In some embodiments, Ra is less than 35, 30, 25, or 20 nm after rubbing.

A variety of rubbing techniques can be employed at the time of coating formation or later when the coated article is used or about to be used. Simply wiping or buffing the coating a few times using a cheesecloth or other suitable woven, nonwoven or knit fabric will often suffice to form the desired thin layer. Those skilled in the art will appreciate that many other rubbing techniques may be employed. Rubbing can also reduce haze in the cured coating.

A variety of crystalline fluoropolymer particles may be employed including mixtures of different crystalline fluoropolymer particles. The crystalline fluoropolymer particles typically have high crystallinity and therefore a significant melting point (peak maximum) as determined by differential scanning calorimetry in accordance with DIN EN ISO 11357-3:2013-04 under nitrogen flow and a heating rate of 10° C./min.

For example, the crystalline fluoropolymer particles may include particles of fluoropolymers having a Tm of at least 100, 110, 120, or 130° C. In some embodiments, the crystalline fluoropolymer particles may include particles of fluoropolymers having a Tm no greater than 350, 340, 330, 320, 310 or 300° C.

The crystalline fluoropolymer particles typically have a fluorine content greater than about 50 weight percent. Also, the fluoropolymer particles may include particles of fluoropolymers having a fluorine content between about 50 and about 76 weight percent, between about 60 and about 76 weight percent, or between about 65 and about 76 weight percent.

Representative crystalline fluoropolymers include, for example, perfluorinated fluoropolymers such as 3M™ Dyneon™ PTFE Dispersions TF 5032Z, TF 5033Z, TF 5035Z, TF 5050Z, TF 5135GZ, and TF 5070GZ; and 3M™ Dyneon™ Fluorothermoplastic Dispersions PFA 6900GZ, PFA 6910GZ, FEP 6300GZ, and THV 340Z.

Other suitable fluoropolymer particles are available from suppliers such as Asahi Glass, Solvay Solexis, and Daikin Industries and will be familiar to those skilled in the art.

Commercial aqueous dispersion usually contain non-ionic and/or ionic surfactants at concentration up to 5 to 10 wt. %. These surfactants are substantially removed by washing the coagulated blends. A residual surfactant concentration of less than 1, 0.05, or 0.01 wt. % may be present. Quite often it is more convenient to use the "as polymerized" aqueous fluoropolymer-latexes as they do not contain such higher contents of non-ionic/ionic surfactants.

As previously described, the crystalline fluoropolymers have a melt point that can be determined by DSC. Crystallinity depends on the selection and concentration of polymerized monomers of the fluoropolymer. For example, PTFE homopolymers (containing 100% TFE-units) have a melting point (Tm) above 340° C. The addition of comonomers, such as the unsaturated (per)fluorinated alkyl ethers, reduces the Tm. For example, when the fluoropolymer contains about 3-5 wt. % of polymerized units of such comonomer, the Tm is about 310° C. As yet another example, when the fluoropolymer contains about 15-20 wt. % of polymerized units of HFP, the Tm is about 260-270° C. As yet another example, when the fluoropolymer contains 30 wt. % of polymerized units of (per)fluorinated alkyl ethers (e.g. PMVE) or other comonomer(s) that reduce the crystallinity the fluoropolymer no longer has a detectable melting point via DSC, and thus is characterized as being amorphous.

In some embodiments, the crystalline fluoropolymer particles contain at least 40, 45, 50, 55, 60, 65, 70, 75, 80, 85, 90, 95 or about 100 wt. % of polymerized units of TFE. Further, the crystalline fluoropolymer particles typically comprise a lower concentration of unsaturated (per)fluorinated alkyl ethers (e.g. PMVE) than the amorphous fluoropolymer. In typical embodiments, the crystalline fluoropolymer particles contain less than 30, 25, 20, 15, 10, or 5 wt. % of polymerized units of (per)fluorinated alkyl ethers (e.g. PMVE).

In some embodiments, the crystalline fluororpolymers are copolymers formed from the constituent monomers known as tetrafluoroethylene ("TFE"), hexafluoropropylene ("HFP"), and vinylidene fluoride ("VDF," "VF2,"). The monomer structures for these constituents are shown below:

$$TFE: CF_2{=}CF_2 \quad (1)$$

$$VDF: CH_2{=}CF_2 \quad (2)$$

$$HFP: CF_2{=}CF{-}CF_3 \quad (3)$$

In some embodiments, the crystalline fluoropolymer consists of at least two of the constituent monomers (HFP and VDF), and in some embodiments all three of the constituents monomers in varying amounts.

The Tm depends on the amounts of TFE, HFP, and VDF. For example, a fluoropolymer comprising about 45 wt. % of polymerized units of TFE, about 18 wt. % of polymerized units of HFP, and about 37 wt. % of polymerized units of VDF has a Tm of about 120° C. As yet another example, a fluoropolymer comprising about 76 wt. % of polymerized units of TFE, about 11 wt. % of polymerized units of HFP, and about 13 wt. % of polymerized units of VDF has a Tm of about 240° C. By Increasing the polymerized units of HFP/VDF, while reducing the polymerized units of TFE, the fluoropolymer becomes amorphous. An overview of crystalline and amorphous Fluoropolymers is given in: Ullmann's Encyclopedia of Industrial Chemistry ($7^{th}$ Edition, 2013 Wiley-VCH Verlag. 10. 1002/14356007.a11 393 pub 2) Chapter: Fluoropolymers, Organic.

The crystalline fluoropolymer particles and amorphous fluoropolymer particles may be combined in a variety of ratios. For example, the coating composition contains about 5 to about 95 weight percent crystalline fluoropolymer particles and about 95 to about 5 weight percent amorphous fluoropolymer, based on the total weight percent of solids (i.e. excluding the solvent). In some embodiments, the coating composition contains about 10 to about 75 weight percent crystalline fluoropolymer particles and about 90 to about 25 weight amorphous fluoropolymer.

In some embodiments, the coating composition contains about 10 to about 50 weight percent crystalline fluoropolymer particles and about 90 to about 50 weight percent amorphous fluoropolymer. In some embodiments, the coating composition contains about 10 to about 30 weight percent crystalline fluoropolymer particles and about 90 to about 70 weight percent amorphous fluoropolymer.

Compositions containing curable fluoroelastomers may further contain additives as known in the art. Examples include acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0.5 and 5 parts per 100 parts of fluorinated polymer.

The fluoropolymer composition may contain further additives, such as stabilizers, surfactants, ultraviolet ("UV") absorbers, antioxidants, plasticizers, lubricants, fillers, and processing aids typically utilized in fluoropolymer processing or compounding, provided they have adequate stability for the intended service conditions. A particular example of additives includes carbon particles, like carbon black, graphite, soot. Further additives include but are not limited to pigments, for example iron oxides, titanium dioxides. Other additives include but are not limited to clay, silicon dioxide, barium sulphate, silica, glass fibers, or other additives known and used in the art.

In some embodiments, the fluoropolymer composition comprises silica, glass fibers, thermally conductive particles, or a combination thereof. Any amount of silica and/or glass fibers and/or thermally conductive particles may be present. In some embodiments, the amount of silica and/or glass fibers is at least 0.05, 0.1, 0.2, 0.3 wt. % of the total solids of the composition. In some embodiments, the amount of silica and/or glass fibers is no greater than 5, 4, 3, 2, or 1 wt. % of the total solids of the composition. Small concentrations of silica can be utilized to thicken the coating composition. Further, small concentrations of glass fibers can be used to improve the strength of the fluoropolymer film. In other embodiments, the amount of glass fibers can be at least 5, 10, 15, 20, 25, 35, 40, 45 or 50 wt-% of the total solids of the composition. The amount of glass fibers is typically no greater than 55, 50, 45, 40, 35, 25, 20, 15, or 10 wt. %. In some embodiments, the glass fibers have a mean length of at least 100, 150, 200, 250, 300, 350, 400, 450, 500 microns. In some embodiments, the glass fibers have a mean length of at least 1, 2, or 3 mm and typically no greater than 5 or 10 mm. In some embodiments, the glass fibers have a mean diameter of at least 1, 2, 3, 4, or 5 microns and typically no greater than 10, 15, 30, or 25 microns. The glass fibers can have aspect ratio of at least 3:1, 5:1, 10:1, or 15:1.

In some embodiments, the fluoropolymer composition is free of (e.g. silica) inorganic oxide particles. In other embodiments, the fluoropolymer composition comprises (e.g. silica and/or thermally conductive) inorganic oxide particles. In some embodiments, the amount of (e.g. silica and/or thermally conductive) inorganic oxide particles is at least 5, 10, 15, 20, 25, 30, 35, 40, 45 or 50 wt. % of the total solids of the composition. In some embodiments, the amount of (e.g. silica and/or thermally conductive) inorganic oxide particles is no greater than 90, 85, 80, 75, 70, or 65 wt. % of the total solids of the composition. Various combinations of silica and thermally conductive particles can be utilized. In some embodiments, the total amount of (e.g. silica and thermally conductive) inorganic oxide particles or the amount of a specific type of silica particle (e.g. fused silica, fumed silica, glass bubbles, etc.) or thermally conductive particle (e.g. boron nitride, silicon carbide, aluminum oxide, aluminum trihydrate) is no greater than 60, 55, 50, 45, 40, 35, 30, 25, 20, 15, 10, or 5 wt. % of the total solids of the composition. Higher concentrations of (e.g. silica) inorganic oxide particles can be favorable to further reducing the dielectric properties. Thus, the compositions including (e.g. silica) inorganic oxide particles can have even lower dielectric properties than the crosslinked fluoropolymer alone.

In some embodiments, the (e.g. silica) inorganic oxide particles and/or glass fibers have a dielectric constant at 1 GHz of no greater than 7, 6.5, 6, 5.5, 5, 4.5, or 4. In some embodiments, the (e.g. silica) inorganic oxide particles and/or glass fibers have a dissipation factor at 1 GHz of no greater than 0.005, 004, 0.003, 0.002, or 0.0015.

In some embodiments, the composition comprises inorganic oxide particles or glass fibers that comprise predominantly silica. In some embodiments, the amount of silica is typically at least 50, 60, 70, 75, 80, 85, or 90 wt. % of the inorganic oxide particles or glass fibers. In some embodiments, the amount of silica is typically at least 90, 91, 92, 93, 94, 95, 96, 97, 98, 99, or greater (e.g. at least 99.5, 99.6, or 99.7) wt-% silica. Higher silica concentrations typically have lower dielectric constants. In some embodiments, (e.g. fused) silica particle can further comprise small concentration of other metals/meta oxides such as $Al_2O_3$, $Fe_2O_5$, $TiO_2$, $K_2O$, CaO, MgO and $Na_2O$. In some embodiments, the total amount of such metals/metal oxides (e.g. $Al_2O_3$, CaO and MgO) is independently no greater than 30, 25, 20, 15, or 10 wt. %. In some embodiments, the inorganic oxide particles or glass fibers may comprise $B_2O_3$ The amount of $B_2O_3$ can range up to 25 wt. % of the inorganic oxide particles or glass fibers. In other embodiments, (e.g. fumed) silica particle can further comprise small concentration of additional metals/metal oxides such as Cr, Cu, Li, Mg, Ni, P and Zr. In some embodiments, the total amount of such metals or metal oxides is no greater 5, 4, 3, 2, or 1 wt. %. In some embodiments, the silica may be described as quartz. The amount of non-silica metals or metal oxides can be determined by uses of inductively coupled plasma mass spectrometry. The (e.g. silica) inorganic oxides particles are typically dissolved in hydrofluroic acid and distilled as $H_2SiF_6$ at low temperatures.

In some embodiments, the inorganic particles may be characterized as an "agglomerate", meaning a weak association between primary particles such as particles held together by charge or polarity. Agglomerate are typically physically broken down into smaller entities such as primary particles during preparation of the coating solution. In other embodiments, the inorganic particles may be characterized as an "aggregate", meaning strongly bonded or fused particles, such as covalently bonded particles or thermally bonded particles prepared by processes such as sintering, electric arc, flame hydrolysis, or plasma. Aggregates are typically no broken down into smaller entities such as primary particles during preparation of the coating solution. "Primary particle size" refers to the mean diameter of a single (non-aggregate, non-agglomerate) particle.

The (e.g. silica) particles may have various shapes such as spherical, ellipsoid, linear or branched. Fused and fumed silica aggregates are more commonly branched. The aggregate size is commonly at least 10× the primary particle size of discrete part.

In other embodiments, the (e.g. silica) particles may be characterized as glass bubbles. The glass bubble may be prepared from soda lime borosilicate glass. In this embodiment, the glass may contain about 70 percent silica (silicon dioxide), 15 percent soda (sodium oxide), and 9 percent lime (calcium oxide), with much smaller amounts of various other compounds.

In some embodiments, the inorganic oxide particles may be characterized as (e.g. silica) nanoparticles, having a mean or median particles size less than 1 micron. In some embodiments, the mean or median particle size of the (e.g. silica) inorganic oxide particles is at 500 or 750 nm. In other embodiments, the mean particle size of the (e.g. silica) inorganic oxide particles may be at least 1, 1.5, 2, 2.5, 3, 3.5, 4, 4.5, 5, 5.5, 6, 6.5, 7, 7.5, 8, 8.5, 9, 9.5 or 10 microns. In some embodiments, the mean particle size in no greater than 30, 25, 20, 15, or 10 microns. In some embodiments, the composition comprises little or no (e.g. colloidal silica) nanoparticles having a particle of 100 nanometers or less.

The concentration of (e.g. colloidal silica) nanoparticles is typically less than (10, 9, 8, 7, 6, 5, 4, 3, 2, or 1 wt. %) The inorganic oxide (e.g. silica particle) may comprise a normal distribution of particle sizes having a single peak or a distribution of particles having two or more peaks.

In some embodiments, no greater than 1 wt. % of the (e.g. silica) inorganic oxide particles have a particle size greater than or equal to 3 or 4 microns. In some embodiments, no greater than 1 wt. % of the (e.g. silica) inorganic oxide particles have a particle size greater than or equal to 5 or 10 microns. In other embodiments, no greater than 5, 4, 3, 2, or 1 wt. % of the particles have a particle size greater than 45 microns. In some embodiments, no greater than 1 wt. % of the particles have a particle size ranging from 75 to 150 microns.

In some embodiments, the mean or median particle size refers to the "primary particle size" referring to the mean or median diameter of discrete a non-aggregated, non-agglomerated particles. For example, the particle size of colloidal silica or glass bubbles is typically the mean or median particle size of In preferred embodiments, the mean or median particle size refers to the mean or median diameter of the aggregates. The particle size of the inorganic particles can be measured using transmission electron microscopy. The particle size of the fluoropolymer coating solution can be measured using dynamic light scattering.

In some embodiments, the (e.g. silica) inorganic particles have a specific gravity ranging from 2.18 to 2.20 g/cc.

Aggregated particles, such as in the case of fumed and fused (e.g. silica) particles, can have a lower surface area than primary particles of the same size. In some embodiments, the (e.g. silica) particle have a BET surface area ranging from about 50 to 500 $m^2/g$. In some embodiments, the BET surface area is less than 450, 400, 350, 300, 250, 200, 150, or 100 $m^2/g$. In some embodiments, the inorganic nanoparticles may be characterized as colloidal silica. It is appreciated that unmodified colloidal silica nanoparticles commonly comprise hydroxyl or silanol functional groups on the nanoparticle surface and are typically characterized as hydrophilic.

In some embodiments, (e.g. silica aggregate) inorganic particles and especially colloidal silica nanoparticles are surface treated with a hydrophobic surface treatment. Common hydrophobic surface treatments include compounds such as alkoxylsilanes (e.g. octadecytriethoxysilane), silazane, or siloxanes. Various hydrophobic fumed silicas are commercially available from AEROSIL™, Evonik, and various other suppliers. Representative hydrophobic fumed silica include AEROSIL™ grades R 972, R 805, RX 300, and NX 90 S.

In some embodiments, (e.g. silica aggregate) inorganic particles are surface treated with a fluorinated alkoxysilane silane compound. Such compounds typically comprise a perfluoroalkyl or perfluoropolyether group. The perfluoroalkyl or perfluoropolyether group typically has no greater than 4, 5, 6, 7, 8 carbon atoms. The alkoxysilane group can be bonded to the alkoxy silane group with various divalent linking groups including alkylene, urethane, and —$SO_2N$(Me)-. Some representative fluorinated alkoxy silanes are described in U.S. Pat. No. 5,274,159 and WO2011/043973; incorporated herein by reference. Other fluorinated alkoxy silanes are commercially available.

The fluoropolymer compositions may be prepared by mixing the polymer, the curing agent(s) including at least one ethylenically unsaturated curing agent, at least one compound with an electron donor group, optional additives and the fluorinated solvent. In some embodiments, the fluoropolymer is first dissolved in the fluorinated solvent and the other additives, including the curing agent(s) and electron donor compound are added thereafter.

In some embodiments, the fluoropolymer composition comprises thermally conductive particles.

In some embodiments, the thermally conductive inorganic particles are preferably an electrically non-conductive material. Suitable electrically non-conductive, thermally conductive materials include ceramics such as metal oxides, hydroxides, oxyhydroxides, silicates, borides, carbides, and nitrides. Suitable ceramic fillers include, e.g., silicon oxide, zinc oxide, alumina trihydrate (ATH) (also known as hydrated alumina, aluminum oxide, and aluminum trihydroxide), aluminum nitride, boron nitride, silicon carbide, and beryllium oxide. Other thermally conducting fillers include carbon-based materials such as graphite and metals such as aluminum and copper. Combinations of different thermally conductive materials may be utilized. Such materials are not electrically conductive, i.e. have an electronic band gap greater than 0 eV and in some embodiments, at least 1, 2, 3, 4, or 5 eV. In some embodiments, such materials have an electronic band gap no greater than 15 or 20 eV. In this embodiment, the composition may optionally further comprise a small concentration of thermally conductive particles having an electronic band gap of less than 0 eV or greater than 20 eV.

In favored embodiments, the thermally conductive particles comprise a material having a bulk thermal conductivity >10 W/m*K. The thermal conductivity of some representative inorganic materials is set forth in the following table.

| | Thermally Conductive Materials | | |
|---|---|---|---|
| Material | Thermal Conductivity (W/m*K) | Electronic Band Gap (eV) | Density |
| α-Aluminum Oxide[1] | 30 | 5-9 | 3.95 g/cc |
| Alumina Trihydrate[2] | 21 | | 2.42-2.45 g/cc |
| Silicon Carbide (SiC)[1] | 120 | 2.4 | 3.21 g/cc |
| Hexagonal Boron Nitride (BN)[1] | 185-300 | 2.1 | 2.1 g/cc |

In some embodiments, the thermally conductive particles comprise material(s) having a bulk thermal conductivity of at least 15 or 20 W/m*K. In other embodiments, the thermally conductive particles comprise material(s) having a bulk thermal conductivity of at least 25 or 30 W/m*K. In yet other embodiments, the thermally conductive particles comprise material(s) having a bulk thermal conductivity of at least 50, 75 or 100 W/m*K. In yet other embodiments, the thermally conductive particles comprise material(s) having a bulk thermal conductivity of at least 150 W/m*K. In typical embodiments, the thermally conductive particles comprise material(s) having a bulk thermal conductivity of no greater than about 350 or 300 W/m*K.

Thermally conductive particles are available in numerous shapes, e.g. spheres and acicular shapes that may be irregular or plate-like. In some embodiments, the thermally conductive particles are crystals, typically have a geometric shape. For example, boron nitride hexagonal crystals are commercially available from Momentive. Further, alumina trihydrate is described as a hexagonal platelet. Combinations of particles with different shapes may be utilized. The thermally conductive particles generally have an aspect ratio less than 100:1, 75:1, or 50:1. In some embodiment, the thermally conductive particles have an aspect ratio less than 3:1, 2.5:1, 2:1, or 1.5:1. In some embodiments, generally symmetrical (e.g., spherical, semi-spherical) particles may be employed.

Boron nitride particles are commercially available from 3M as "3M™ Boron Nitride Cooling Fillers".

In some embodiments, the boron nitride particles has a bulk density of at least 0.05, 0.01, 0.15, 0.03 g/cm³ ranging up to about 0.60, 0.70, or 0.80 g/cm³. The surface area of the boron nitride particle can be <25, <20, <10, <5, or <3 m²/g. The surface area is typically at least 1 or 2 m²/g.

In some embodiments, the particle size, d(0.1), of the boron nitride (e.g. platelet) particles ranges from about 0.5 to 5 microns. In some embodiments, the particle size, d(0.9), of the boron nitride (e.g. platelet) particles is at least 5 ranging up to 20, 25, 30, 35, 40, 45, or 50 microns.

The coating composition described herein including fluorinated solvent is "stable, meaning that the coating composition remains homogeneous when stored for at least 24 hours at room temperature in a sealed container. In some embodiments, the coating composition is stable for one week or more. "Homogeneous" refers to a coating composition that does not exhibit a visibly separate precipitate or visibly separate layer when freshly shaken, placed in a 100 ml glass container and allowed to stand at room temperature for at least 4 hours.

In some embodiments, the fluoropolymer is first combined with other solid ingredients and in particular with the electron donor (e.g. amine) compounds and ethylenically unsaturated curing agent described herein, as well as the (e.g. silica) inorganic particles when present. The fluoropolymer and amine compounds can be combined in conventional rubber processing equipment to provide a solid mixture, i.e. a solid polymer containing the additional ingredients, also referred to in the art as a "compound". Typical equipment includes rubber mills, internal mixers, such as Banbury mixers, and mixing extruders. During mixing the components and additives are distributed uniformly throughout the resulting fluorinated polymer "compound" or polymer sheets. The compound is then preferably comminuted, for example by cutting it into smaller pieces and is then dissolved in the solvent.

The fluoropolymer coating solution compositions provided herein are suitable for coating substrates. The fluoropolymer coating solution compositions may be formulated to have different viscosities depending on solvent and fluoropolymer content and the presence or absence of optional additives. The fluoropolymer coating solution compositions typically contain or are solutions of fluoropolymers and may be in the form of liquids or pastes. Nevertheless, the compositions may contain dispersed or suspended materials but these materials preferably are additives and not fluoropolymers of the type as described herein. Preferably, the compositions are liquids and more preferably they are solutions containing one or more fluoropolymer as described herein dissolved in a solvent as described herein.

The fluoropolymer compositions provided herein are suitable for coating substrates and may be adjusted (by the solvent content) to a viscosity to allow application by different coating methods, including, but not limited to spray coating or printing (for example but not limited to ink-printing, 3D-printing, screen printing), painting, impregnating, roller coating, bar coating, dip coating and solvent casting.

Coated substrates and articles may be prepared by applying the fluoropolymer compositions to a substrate and removing the solvent. The curing may occur to, during, or after removing the solvent. The solvent may be reduced or completely removed, for example for evaporation, drying or by boiling it off. After removal of the solvent the composition may be characterized as "dried".

Methods of making a crosslinked fluoropolymer described herein comprise curing the fluoropolymer with (e.g. UV or e-beam) actinic irradiation. The fluoropolymer composition, substrate, or both are transmissive to the curing radiation. In some embodiments, a combination of UV curing and thermal (e.g. post) curing is utilized. The curing is carried out at an effective temperature and effective time to create a cured fluoroelastomer. Optimum conditions can be tested by examining the fluoroelastomer for its mechanical and physical properties. Curing may be carried out under pressure or without pressure in an oven. A post curing cycle at increased temperatures and or pressure may be applied to ensure the curing process is fully completed. The curing conditions depend on the curing system used.

In some embodiments, the composition is cured by UV-curing. The fluoropolymers of the compositions described here comprise little or no polymerized units of vinylidene fluoride (VDF) (i.e. $CH_2=CF_2$) or VDF coupled to hexafluoropropylene (HFP). Polymerized units of VDF can undergo dehydrofluorination (i.e. an HF elimination reaction) as described in US2006/0147723. The reaction is limited by the number of polymerized VDF groups coupled to an HFP group contained in the fluoropolymer. The double bonds created as a result of dehydrofluorination can then react (via Michael addition) with an amino alkoxy silane thereby grafting fluorinated pendent alkoxy silane groups onto the fluoropolymer backbone. When irradiated with UV light, such pendent groups can free-radically copolymerize with multifunctional (meth)acrylate compounds.

However, since the fluoropolymers of the compositions described here comprise little or no polymerized units of VDF (i.e. $CH_2=CF_2$) coupled to an HFP group, the fluoropolymers are not susceptible to the reaction schemes just described. As evident by the forthcoming examples, the amine compound alone can initiate UV-curing in the absence of free-radical photoinitiators. The inclusion of free-radical photoinitiator typically does not increase the crosslinking of the fluoropolymer. This result suggests that the fluoropolymer is not crosslinked via a free-radical mechanism.

Although, conventional free-radical initiators are not required, the composition can optionally further comprise a photoinitiator. In other embodiments, the composition is substantially free of free-radical initiators including such free-radical photoinitiators.

In some embodiments, the UV radiation may have sufficient intensity at a wavelength of at least 190 nm, 200 nm, 210 nm, 220 nm, 230 nm or 240 nm. In some embodiments, the UV radiation may have sufficient intensity at a wavelength no greater than 350 nm, 340 nm, 330 nm, 320 nm, 310 nm, or 290 nm. In some embodiments, the (e.g. UV) actinic radiation has sufficient intensity at a wavelength ranging from 270-290 nm such that in the presence of an (e.g. amine) electron donor a wavelength-induced single electron transfer reaction may occur between C-I bonds. In some embodiments, the UV radiation may have sufficient intensity at a wavelength ranging below 240 nm (e.g. 150-200 nm) such that in the presence of an (e.g. amine) electron donor a wavelength-induced single electron transfer reaction may occur between C—Cl or C—Br bonds.

UV light sources can be of various types. Low light intensity sources, such as blacklights, generally provide intensities ranging from 0.1 or 0.5 mW/cm² (millwatts per square centimeter) to 10 mW/cm² (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm² ranging up to 450 mW/cm² or greater. In some embodiments, high intensity light sources provide intensities up to 500, 600, 700, 800, 900 or 1000 mW/cm². UV light to polymerize the ethylenically unsaturated monomer(s) can be provided by various light sources such as light emitting diodes (LEDs), fluorescent blacklights, arc-lamps such as xenon-acrc lamps and medium and low pressure mercury lamps (including germicidal lamps), microwave-driven lamps, lasers etc. or a combination thereof. The composition can also be polymerized with higher intensity light sources as available from Fusion UV Systems Inc. Lamps that emit ultraviolet or blue light are typically preferred. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds. In some embodiments, post curing may be carried out at a temperature between 170° C. and 250° C. for a period of 0.1 to 24 hours.

In some embodiments, post curing of the fluoropolymer may optionally be carried out at lower temperatures. Post curing at lower temperatures is amenable for coating heat sensitive substrates. In some embodiments, the post curing occurs at a temperature ranging from 100, 110, 120, 130, 135 or 140° C. up to 170° C. for a period of 5-10 minutes to 24 hours. In some embodiments, the temperature is no greater than 169, 168, 167, 166, 165, 164, 163, 162, 161, or 160° C. In some embodiments, the temperature is no greater than 135, 130, 125, or 120° C. In favored embodiments, after curing the fluoropolymer is sufficiently crosslinked such that at least 80, 85, 90, 95 or 100 wt. % or greater cannot be dissolved (within 12 hours at 25° C.) in fluorinated solvent (e.g. 3-ethoxy perfluorinated 2-methyl hexane) at a weight ratio of 5 grams of fluoropolymer in 95% by weight of fluorinated solvent.

The compositions may be used for impregnating substrates, printing on substrates (for example screen printing), or coating substrates, for example but not limited to spray coating, painting dip coating, roller coating, bar coating, solvent casting, paste coating. The substrate may be organic, inorganic, or a combination thereof. Suitable substrates may include any solid surface and may include substrate selected from glass, plastics (e.g. polycarbonate), composites, metals (stainless steel, aluminum, carbon steel), metal alloys, wood, paper among others. The coating may be coloured in case the compositions contains pigments, for example titanium dioxides or black fillers like graphite or soot, or it may be colorless in case pigments or black fillers are absent.

Bonding agents and primers may be used to pretreat the surface of the substrate before coating. For example, bonding of the coating to metal surfaces may be improved by applying a bonding agent or primer. Examples include commercial primers or bonding agents, for example those commercially available under the trade designation CHEM-LOK.

Articles containing a coating from the compositions provided herein include but are not limited to impregnated textiles, for example protective clothing. Another example of an impregnated textile is a glass scrim impregnated with the (e.g. silica containing) fluoropolymer composition described herein. Textiles may include woven or non-woven fabrics. Other articles include articles exposed to corrosive environments, for example seals and components of seals and valves used in chemical processing, for example but not limited to components or linings of chemical reactors, molds, chemical processing equipment for example for etching, or valves, pumps and tubings, in particular for corrosive substances or hydrocarbon fuels or solvents; combustion engines, electrodes, fuel transportation, containers for acids and bases and transportation systems for acids and bases, electrical cells, fuel cells, electrolysis cells and articles used in or for etching.

An advantage of the coating compositions described herein is that the coating compositions can be used to prepare coatings or fluuoroplymer sheets of high or low thickness. In some embodiments, the dried and cured fluoropolymer has a thickness of 0.1 microns to 1 or 2 mils. In some embodiments, the dried and cured fluoropolymer thickness is at least 0.2, 0.3, 0.4, 0.5, or 0.6 microns. In some embodiments, the dried and cured fluoropolymer thickness is at least 1, 2, 3, 4, 5, or 6 microns.

In typical embodiments, the dried and cured (i.e. crosslinked) composition has a low dielectric constant (Dk), typically less than 2.75, 2.70, 2.65, 2.60, 2.55, 2.50, 2.45, 2.40, 2.35, 2.30, 2.25, 2.20, 2.15, 2.20, 2.15, 2.10, 2.05, 2.00, 1.95, 1.90. In some embodiments, the dielectric constant is at least 2.02, 2.03, 2.04, 2.05. The dried and cured (i.e. crosslinked) composition has a low dielectric loss, typically less than 0.01, 0.009, 0.008, 0.007, 0.006, 0.005, 0.004, 0.003, 0.002, 0.001, 0.0009, 0.0008, 0.0007, 0.0006, 0.0005, 0.0004, 0.0003. In some embodiments, the dielectric loss is at least 0.00022, 0.00023, 0.00024, 0.00025.

The dried and cured coating can exhibit good adhesion to various substrates (e.g. glass, polycarbonate), as evidence by the coating exhibiting a 2, and preferably a 3 or 4 according to the Boiling Water Test described in PCT/US2019/036460. In favored embodiments, the dried and cured coating is durable as evidence by the coating exhibiting a 2, and preferably a 3 or 4 according to the Abrasion Test described in previously cited PCT/US2019/036460. In some embodiments, the coating is durable, according to the Abrasion Test after being subjected to the Boiling Water Test.

The dried and cured coating can exhibit good adhesion to metals, such as copper. For example, in some embodiments, the T-peel to copper foil is at least 0.1, 0.2, 0.3, 0.4, 0.5 or 0.6 N/mm ranging up to at least 1 N/mm (i.e. 10 N/cm), 1.5 N/mm 2 N/mm or 2.5 N/mm as determined by the test method described in the examples.

In some embodiments, the dried and cured coating has good hydrophobic and oleiphobic properties according to the Black Permanent Marker Resistance Test described in previously cited PCT/US2019/036460, i.e. the marker fluid beads and is easy to remove with a paper towel or cloth.

In some embodiments, the dried and cured coating has good hydrophobic and oleiphobic properties, as determined by Contact Angle Measurements (as determined according to the test method described in the examples). In some embodiments, the static, advancing and/or receding contact angle with water can be at least 100, 105, 110, 115, 120, 125 and typically no greater than 130 degrees. In some embodiments, the advancing and/or receding contact angle with hexadecane can be at least 60, 65, 70, or 75 degrees. In some embodiments, the coating exhibits such contact angles, after being subjected to the Boiling Water Test or after being subject the Boiling Water Test and the Abrasion Test (as determined according to the test method described in previously cited PCT/US2019/036460).

In some embodiments, the dried and cured coating exhibits good corrision resistance (i.e. not corroded) according to the Acid/Base Corrison Test described in previously cited PCT/US2019/036460.

In some embodiments, the dried and cured coating (e.g. film) exhibits low water absorption e.g. less than 0.5, 0.4, 0.3, 0.2, or 0.1 as determined by the Moisture Uptake test method described in the examples.

In some embodiments, the composition exhibits a low coefficient of thermal expansion e.g. less than 150, 100, 50, 40, 30, 20 or 10 as determined by the test method described in the examples. For some insulation layer uses the coefficient of thermal expansion is less critical and may range up to 175, 200 or 225.

As used herein the term "partially fluorinated alkyl" means an alkyl group of which some but not all hydrogens bonded to the carbon chain have been replaced by fluorine. For example, an $F_2HC$—, or an $FH_2C$— group is a partially fluorinated methyl group. Alkyl groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example, residues of the formula $F_2ClC$— or $FHClC$— are also partially fluorinated alkyl residues.

A "partially fluorinated ether" is an ether containing at least one partially fluorinated group, or an ether that contains one or more perfluorinated groups and at least one non-fluorinated or at least one partially fluorinated group. For example, $F_2HC$—O—$CH_3$, $F_3C$—O—$CH_3$, $F_2HC$—O—$CFH_2$, and $F_2HC$—O—$CF_3$ are examples of partially fluorinated ethers. Ethers groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example, ethers of the formula $F_2ClC$—O—$CF_3$ or $FHClC$—O—$CF_3$ are also partially fluorinated ethers.

The term "perfluorinated alkyl" or "perfluoro alkyl" is used herein to describe an alkyl group where all hydrogen atoms bonded to the alkyl chain have been replaced by fluorine atoms. For example, $F_3C$— represents a perfluoromethyl group.

A "perfluorinated ether" is an ether of which all hydrogen atoms have been replaced by fluorine atoms. An example of a perfluorinated ether is $F_3C$—O—$CF_3$.

The following examples are provided to further illustrate the present disclosure without any intention to limit the disclosure to the specific examples and embodiments provided.

EXAMPLES

Unless otherwise noted or readily apparent from the context, all parts, percentages, ratios, etc. in the Examples and the rest of the specification are by weight.

TABLE 1

Materials:

| Abbreviation | Name | Source |
| --- | --- | --- |
| PFE-1 | Coagulated gum obtained from 30 wt. % solids aqueous perfluoroelastomer latex - 50.4 wt. % PMVE, 49.6 wt. % TFE, and 0.4 wt. % iodine, having a Mooney value of 40 as can prepared according to WO2015/088784 or WO2015/134435, | 3M Dyneon |
| PFE-2 | Coagulated gum obtained from 34 wt. % solids aqueous perfluoroelastomer latex - 49 wt. % PMVE, 51 wt. % TFE, 0.4 wt. % bromine, having a Mooney value of 60. | 3M Dyneon |
| PFE-3 | Perfluoroelastomer latex or coagulated gum comprising a copolymer of 65.8 mol % TFE, 33 mol PMVE, 1.2 mol % of a nitrile vinylether | 3M Dyneon |
| Novec 7500 (HFE-7500) | 3-ethoxy perfluorinated 2-methyl hexane | 3M EMSD |
| Novec 7300 (HFE-7300) | 3-methoxy perfluorinated 4-methyl petane | 3M EMSD |
| APES/APS | (3-Aminopropyl)triethoxysilane | Aldrich |
| TMDAB | N,N,N',N'-Tetramethyl-1,4-diamino butane | Aldrich |
| BTMP-Me-A | Bis(3-trimethoxysilylpropyl)-n-methylamine | Gelest Corporation |
| Amines | Diamino hexane, N,N-dimethyl aniline, Triethylenetetramine, Diethylenetriamine | Aldrich |
| ATES | Allyltriethoxysilane | Aldrich |
| DADMS | Diallyldimethylsilane | Gelest Corporation |
| DVTM-D-siloxane | 1,3-Divinyltetramethyl disiloxane | Gelest Corporation |
| Me-Ac-PTMS | 3-(Methacryloylpropyl) trimethoxysilane | Gelest Corporation |
| N-Me-APMS | N-methylaminopropyl trimethoxysilane | Gelest Corporation |
| TMOS | Tetramethyl orthosilicate | Aldrich |
| Darocure 1173 or 1173 | 2-hydroxy-2-methyl-1-phenyl-1-propanone photoinitiator | BASF |
| THV340 | 3M, DYNEON Fluoroplastic Dispersion THV 340Z, Tm = 140° C. 50 wt. % solids diluted to 30 wt. % solids | 3M Dyneon |
| THV-2 | 30 wt. % solids aqueous polymer latex - 59 wt. % TFE, 19 wt. % HFP, 22 wt. % VDF, Tm = 165° C., MFI (265° C./5 kg) 10.5 g/10 min as can be prepared according to EP1155055 or U.S. Pat. No. 5,463,021 | 3M Dyneon |
| THV-1 | 30 wt. % solids aqueous polymer latex 76 wt. % TFE, 11 wt. % HFP, 13 wt. % VDF, Tm = 236° C., MFI (265° C./5 kg) 10.5 g/10 min as can be prepared according to EP1155055 or U.S. Pat. No. 5,463,021 | 3M Dyneon |
| PFA | 30 wt. % solids aqueous latex - 96 wt. % TFE, 4 wt. % PPVE, Tm is 308° C., MFI (372° C./5 kg) 7 g/10 min | 3M Dyneon |
| PFA-2 | Latex (30 w % solids) comprising a polymer of TFE (97 w %), PMVE ($CF_2$=CF—O—$CF_3$, 2 w %) and $CF_2$=CF—$CF_2$—O—$C_3F_7$ (1 w %), melting point 307° C., MFI (372° C./5 kg) 2 g/10 min | 3M Dyneon |
| PTFE | 20 wt. % solids aqueous PTFE homopolymer latex, Tm = 342° C., as can be prepared according to EP1155055 | 3M Dyneon |
| CQ0382 | Fused silica with surface treatment (D90 = 4 um) | Suzhou Ginet |
| CQ1082 | Fused silica with surface treatment (D90 = 12 um) | Suzhou Ginet |
| FS 20 | 3M ™ Fused Silica 20 (9-16 um) | 3M |
| FS 550 | 3M ™ Fused Silica 550 (3.5-5.2 um) | 3M |
| GB | 3M ™ Glass Bubbles iM16K (20 um) | 3M |
| FG-Si | Fine ground silica (MIN-U-SIL 5, D90 = 3.5 um) | US Silica Co |
| BTESPA | Bis(triethoxylsilyl)propyl amine, $NH(C_3H_6Si(OEt)_3)_2$ | Gelest |
| TEOS | Tetraethoxysilane, $(EtO)_4Si$ | Aldrich |
| C4-Si | $C_4F_9SO_2NMeCH_2CH_2CH_2Si(OMe)_3$, Prepared by the procedure described in Ex-6 of US5274159, except using $C_4F_9SO_2NMeCH_2CH$=$CH_2$ for replacement of $C_8F_{17}SO_2NEtCH_2CH$=$CH_2$ | 3M |
| C6-Si | $C_6F_{13}CH_2CH_2Si(OEt)_3$, DYNASYLAN F8261 | Evonic |
| HFPO-Si | $F(CF(CF_3)CF_2O)_n$-$CF(CF_3)CO_2NH$-$CH_2CH_2CH_2Si(OMe)_3$, (MW ~1155) | Surfactis Technologies |
| TAIC | Triallyl isocyanuirate, SR533 | Sartomer |
| QF | Quartz fiber, 3 mm length, 8 um diameter | Shenjiu |
| RL Film | Release Liner film, RF02N-3 mil | 3M |
| FEP Film | Fluoropolymer film | DuPont |
| PFA Film | Fluoropolymer film | DuPont |

TABLE 1-continued

Materials:

| Abbreviation | Name | Source |
| --- | --- | --- |
| BTMSPA | Bis(3-trimethoxysilylpropyl)amine | Gelest Corporation |
| TFM-2 | Latex (23 w % solids) comprising a PTFE modified with 0.4 w % PPVE and $CF_2=CF-O-(CF_2)_5CN$ (<0.05 w %) | 3M Dyneon |
| Florinated amidine | Perfluoroamidine; obtained under the trade designation 3M DYNEON PFE 300Z | 3M Dyneon |
| BN CFP 012 | Boron Nitride powder | 3M |
| BN CFP 0075 | Boron Nitride powder | 3M |
| FG6616 | Microglass 6616 (Milled E-glass filaments) | Fibertec (Bridgewater, MA) |
| FG6608 | Microglass 6608 (Milled E-glass filaments) | Fibertec |
| FG3004 | Microglass 3004 (Milled E-glass filaments) | Fibertec |
| Wallonites | Tremin 939-100 MST | The Mineral Engineers |
| FT9110 | Microglass 9110 (Milled E-glass filaments) | Fibertec |
| FT9114 | Microglass 9114 (Milled E-glass filaments) | Fibertec |
| PFE301C | PFE catalyst obtained under the trade designation 3M DYNEON PFE 301C | 3M Dyneon |
| CQ0282 | Fused silica (D90 = 3 microns; Average = 1-2 microns) | Suzhou Ginet |
| PFA-3 | Latex or coagulated solid comprising a copolymer of TFE/PPVE/nitrilvinylether as can be prepared according to Fluoroplastic C of U.S. Pat. No. 7,019,083 | |
| PTFE5033 | Commercial product obtained under the trade designation 3M DYNEON PTFE DISPERSION TF 5033Z; particle size about 200 nm | 3M Dyneon |

Preparation of Fluorinated Ether Diene

A fluorinated ether diol, $HO-CH_2-CF_2-O-(CF_2CF_2)CF_2-CH_2-OH$ (0.16 mol), having an average molecular weight of 1500, and an average hydroxyl functionality of 1.8 as described in U.S. Pat. No. 5,384,374 was allowed to react with sodium methoxide (0.34 mol) and subsequently to react with allyl bromide (40 g, 0.36 mol) in a 250 mL 3-necked flask with a condenser at 60° C. overnight. After reaction, the reaction mixture was washed with water and a pale-yellow liquid was dried over $CaCl_2$ before rotavapor to remove any residue of ally bromide.

General Procedure—Perfluoroelastomer PFE Coating Solution Preparation with Multifunctional Alkene/Aminosilane Ester Photocrosslinkers:

Perfluoroelastomer PFE-1 and PFE-2 solutions were prepared by cutting gums separately into small pieces and adding them into HFE solvent (HFE-7300 or HFE-7500) to make a 10 wt. % PFE in HFE solution (10 g PFE and 90 g HFE). The containers were sealed with PTFE tape and paraffin film. The solution was subject to vigorous shaking overnight (~12 hours) to become completely homogenous.

All the aminosilanes, initiators were dissolved or dispersed in HFE to form 1 wt. % or 5 wt. % solutions or suspensions (e.g. 0.5 g TAIC was added to 9.5 g HFE to form a 5 wt. % suspension in a vial). To the PFE solution was added an amine (e.g. aminosilane), an alkene and, optionally, a photo-initiator. For example, sample (5% TAIC, 1% APES, 2% TMOS) was prepared by adding 0.3157 g TAIC suspension (5 wt. % in HFE), 0.0606 g APES suspension (5 wt. % in HFE), and 0.1224 g TMOS solution (5 wt. % in 7500) to 3 g PFE-1 solution (10 wt. % in PFE-1). Many silanes form suspensions, rather than solutions in HFE. Such suspensions were homogenized using a vortex shaker at 1000 rpm for 10 seconds to form well dispersed slurry before being added to the PFE-HFE solution. Also, the percentage in the formula (e.g., 5%, 3%, 1%) was the mass fraction based on the solid content of PFE (e.g. PFE-1+5% APES+2% 1173 means: the solid content of PFE-1/APES=95:5 and the solid content of PFE-1/1173=98:2)

General Procedure—Perfluoroelastomer PFE Coating Solution Preparation with Fluorinated Alkene/Aminosilane Ester Photo-Crosslinkers:

In a similar fashion as described above, perfluoroelastomer PFE-1 and PFE-2 solutions were prepared by cutting gums separately into small pieces and placing them into HFE solvent to obtain 10 wt. % solutions of PFE in HFE in a glass jar. The glass jar was sealed with Teflon tape and paraffin film. The solution was subjected to vigorous shaking overnight (~12 hours) until completely homogenous. Most alkenes were dissolved or dispersed in HFE to form 1 wt. % or 5 wt. % solution or suspension. Alkenes were dissolved in methanol or methoxy propanol instead when there was rapid phase separations between the alkenes and HFE solution and when the alkene sample was solid at room temperature and could not be completely dispersed in HFE-7500. These alkenes include 4,4'-bis((1,2,2-trifluorovinyl)oxy)-1,1'-biphenyl (dissolved in methanol), Chloro-1,2-phenylene diacrylate (dissolved in methanol), Perchloro-1,2-phenylene diacrylate (dissolved in methoxy propanol), 2,4,6-tribromobenzene-1,3,5-triyl triacrylate (dissolved in methoxy propanol)). In addition to alkenes, all the silanes and photoinitiators were dissolved or dispersed in HFE to form 1 wt. % or 5 wt. % solutions or suspensions. To PFE was added an alkene or a multifunctional alkene and other chemicals including silanes and initiators as indicated in Tables.

Split Post Dielectric Resonator Measurements at 25 GHz

All split-post dielectric resonator measurements were performed in accordance with the standard IEC 61189-2-721 near a frequency of 25 GHz. Each thin material or film was inserted between two fixed dielectric resonators. The resonance frequency and quality factor of the posts are influenced by the presence of the specimen, and this enables the direct computation of complex permittivity (dielectric constant and dielectric loss). The geometry of the split dielectric resonator fixture used in our measurements was designed by the Company QWED in Warsaw Poland. This 25 GHz resonator operates with the $TE_{01d}$ mode which has only an azimuthal electric field component so that the electric field remains continuous on the dielectric interfaces. The split post dielectric resonator measures the permittivity component in the plane of the specimen. Loop coupling (critically coupled) was used in each of these dielectric resonator measurements. This 25 GHz Split Post Resonator measurement system was combined with Keysight VNA (Vector Network Analyzer Model PNA 8364C 10 MHz-50 GHz). Computations were performed with the commercial analysis Split Post Resonator Software of QWED to provide a powerful measurement tool for the determination of complex electric permittivity of each specimen at 25 GHz Coefficient of Thermal Expansion (CTE) Measurement CTE measurements were conducted using a Thermomechanical Analyzer (TMA) TMA Q400 from TA Instrument. The film samples were cut into rectangle shapes (4.5 mm×24 mm) and mounted on the tension clamp. The samples were heated to at least 150° C. using a ramp rate of 3.00° C./min and then cooled to room temperature at the same rate. Then the samples were heated again to the target temperature. The CTE calculated from the second cycle was reported.

Moisture Uptake Measurement

Water absorption measurements were made using a vapor absorption analysis instrument Q500SA from TA Instrument. The sample was placed in a quartz pan located inside a programmable chamber. Approximately 5 mg of sample was used in each measurement. The samples were first dried in the chamber until the weight remained unchanged over 20 min. Then the samples were placed under 60° C. and 50% humidity conditions until weight equilibrium was achieved. The water absorption value was calculated based on the weight increase/original weight of the sample.

T-Peel Measurement

Films were laminated with a Cu foil under 24° C. for 20 min. The laminated samples were cut into strips with 0.5 inch width for T-peel measurement. The measurement was conducted using an INSTRON electromechanical universal testing machine using ASTM D1876 standard method.

Static Contact Angle

Static contact angle measurements were made using deionized water on a drop shape analyzer DSA100 from KRUSS, Germany. Reported values were the average of measurements on at least three drops measured on the right and the left sides of the drops. Drop volumes were 5 μL for static measurements.

Table 2. Crosslinking Yield of Cured Fluoropolymers

For the crosslinking yield studies, samples were prepared by depositing a 3 g solution onto PET film. The coated film was dried at ambient temperature for 2 hours and at 50° C. for 20 min. After the samples were completely dried, the PET film samples were placed on a wooden or a stainless steel board and cured under a single 500 watt H-bulb or 500 watt D-bulb UV lamp for 5-10 runs with a speed of 30 ft per minute (as indicated in the tables). After UV curing, many samples were also thermally cured at 120° C. for 5 min in an oven (as indicated in tables). Some of the same samples were also subjected to thermal curing conditions without UV curing.

The UV cured samples (1-2 mils in thickness) were peeled off from the PET film, weighed, and then dissolved with HFE in a vial. The mass ratio of cured PFE sample/HFE solvent was 5/95. The vial was subjected to vigorous shaking overnight (~12 hours) before any observation was recorded as described in the following table. The precipitated samples (i.e. crosslinked PFE) in the HFE solutions were collected, dried and weighed. In some instances, the gel (i.e. less crosslinked PFE) was collected, dried, and weighed.

| Extent of Crosslinking | Description |
| --- | --- |
| Soluble | Completely soluble or most of sample is dissolved |
| Viscosity builds up | Partially soluble, HFE solution becomes viscous, small amount of precipitate (like small flakes or silks), inseparable |
| Swell, low yield | Noticeable precipitation, largely~medially swell, however a significant amount of sample is dissolved |
| Gel | Sample takes on the appearance of gel, largely swell, inseparable or difficult to separate |
| Swell | Insoluble, apparent swell and increase in volume, the HFE solution is viscous, inseparable or difficult to separate |
| Swell wt. % | Insoluble, apparent swell and increase in volume, the HFE solution is viscous, separable |
| Precipitate | Completely insoluble, a little to no swell, Intact film, HEF has very low viscosity, separable |

TABLE 3

Effect of an aminosilane ester on photochemically crosslinking PFE-1 with TAIC

| Comparative Examples | TAIC or aminosilane Controls | Thermally cured at 120 ° C. 5 min | UV cured 10 times + 120° C. 5 min |
| --- | --- | --- | --- |
| A | % TAIC | — | Gel |
| B | 2.5% TAIC | Soluble | Swell |
| C | 1% APES | soluble | Swell, low yield |
| Examples | TAIC + Primary amine | | |
| 3.1 | 2% TAIC 0.5% APES | — | Precipitate 97.42 wt. % |
| 3.2 | 2.5% TAIC 1% APES | Soluble | Precipitate 96.74 wt. % |
| 3.3 | 5% TAIC 0.5% APES | Soluble | Precipitate 97.37 wt. % |
| 3.4 | 5% TAIC 1% APES | Soluble | Precipitate 97.51 wt. % |
| 3.5 | 5% TAIC 1% APES 2% TMOS | Soluble | Precipitate 97.85 wt. % |
| 3.6 | 5% TAIC 3% APES | — | Precipitate 98.89 wt. % |

TABLE 3-continued

Effect of an aminosilane ester on photochemically crosslinking PFE-1 with TAIC

| Comparative Examples | TAIC or aminosilane Controls | Thermally cured at 120° C. 5 min | UV cured 10 times + 120° C. 5 min |
|---|---|---|---|
| | TAIC + Secondary amine | | |
| 3.7 | 5% TAIC 1% BTEPA | — | Precipitate 95.52 wt. % |
| 3.8 | 5% TAIC 0.5% BTEPA | — | Precipitate 97.45 wt. % |
| 3.9 | 2% TAIC 0.5% BTEPA | — | Precipitate 95.84 wt. % |
| 3.10 | 2.5% TAIC 2.5% N-Me-APMS | Soluble | Precipitate 93.44 wt. % |
| 3.11 | 5% TAIC 0.5% N-Me-APMS | — | Precipitate 98.28 wt. % |
| 3.12 | 5% TAIC 1% N-Me-APMS | Soluble | Precipitate 96.72 wt. % |
| 3.13 | 5% TAIC 1% N-Me-APMS | — | Precipitate 92.86 wt. % |
| 3.14 | 2% TAIC 0.5% N-Me-APMS | — | Precipitate 90.35 wt. % |
| | TAIC + Tertiary amine | | |
| 3.15 | 5% TAIC 0.5% BTMP-Me-A | — | Precipitate 98.62 wt. % |
| 3.16 | 5% TAIC 1% BTMP-Me-A | — | Precipitate 98.40 wt. % |
| 3.17 | 2% TAIC 0.5% BTMP-Me-A | — | Precipitate 93.27 wt. % |
| 3.18 | 5% TAIC 1% N,N-DIME-APMS | — | Precipitate 89.33 wt. % |

TABLE 4

Effect of an organic amine on photochemically crosslinking PFE-1 with TAIC

| Examples | TAIC + Primary organic amine | UV cured 10 times + 120° C. 5 min |
|---|---|---|
| 4.1 | 5% TAIC 1% Diamino hexane | Precipitate 81.33 wt. % |
| | TAIC + Tertiary organic amine | |
| 4.2 | 5% TAIC 1% TMDAB | Precipitate 87.14 wt. % |
| 4.3 | 5% TAIC 1% N,N-dimethyl aniline | Swell 75.44 wt. % |
| | TAIC + Primary + Secondary organic amine | |
| 4.4 | 5% TAIC 1% Triethylenetetramine | Precipitate 98.95 wt. % |
| 4.5 | 5% TAIC 1% Diethylenetriamine | Swell 80.05 wt. % |

TABLE 5

Effect of alkenes on photochemically crosslinking PFE-1 with TAIC

| Examples | Allyl silane | 120° C. 5 min | UV cured 10 times + 120° C. 5 min |
|---|---|---|---|
| 5.1 | 5% DADMS 1% APES 2%1173 | Soluble | Swell 61.39 wt. % |
| 5.2 | 5% DADMS 1% APES | — | Swell 72.76 wt. % |
| | Allyl | | |
| 5.3 | 5% ATES Control | Soluble | Swell 56.95 wt. % |
| 5.4 | 5% ATES 0.5% APES | Soluble | Precipitate 90.69 wt. % |
| 5.5 | 5% ATES 1% APES | Soluble | Precipitate 86.17 wt. % |
| 5.6 | 5% ATES 1% BTEPA | — | Precipitate 85.07 wt. % |
| 5.7 | 5% ATES 1% BTMP-Me-A | — | Swell 65.13 wt. % |

TABLE 5-continued

Effect of alkenes on photochemically crosslinking PFE-1 with TAIC

| Examples | Allyl silane | 120° C. 5 min | UV cured 10 times + 120° C. 5 min |
|---|---|---|---|
| | Acryloyl silane | | |
| 5.8 | 5% Me-Ac-PTMS 5% APES 2%1173 | — | Precipitate |
| 5.9 | 5% Me-Ac-PTMS 5% APES 5%1173 | — | Precipitate |
| 5.10 | 5% Me-Ac-PTMS 2%1173 Control | — | Swell 57.63 wt. % |
| 5.11 | 5% Me-Ac-PTMS 1% APES | — | Swell 62.90 wt. % |
| 5.12 | 5% Me-Ac-PTMS 1% APES 2%1173 | — | Swell 61.02 wt. % |
| | Multifunctional olefin | | |
| 5.13 | 5% Triallylamine 1% APES | Soluble | Precipitate 67.62 wt. % |
| 5.14 | 5% Triallylamine 0.5% APES 2%1173 | Soluble | Swell 63.06 wt. % |
| 5.15 | 5% Triallylamine 1% APES 2%1173 | Soluble | Swell 67.89 wt. % |
| | Vinyl siloxane | | |
| 5.16 | 5% DVTM-D-siloxane 1% APES 2%1173 | Soluble | Swell 83.01 wt. % |

TABLE 6

Influence of wavelength (H-Bulb and D-Bulb) and the number of UV cure runs on UV crosslinking of PFE-1 + TAIC + APES

| Examples | | H-Bulb | D-Bulb |
|---|---|---|---|
| 6.1 | 5% TAIC 1% APES (UV × 2 + 120° C. 5 min) | Precipitate 89.04 wt. % | Precipitate 88.02 wt. % |
| 6.2 | 5% TAIC 1% APES (UV × 4 + 120° C. 5 min) | Precipitate 97.72 wt. % | Precipitate 96.80 wt. % |
| 6.3 | 5% TAIC 1% APES (UV × 4) | Precipitate 86.50 wt. % | Precipitate 86.65 wt. % |
| 6.4 | 5% TAIC 1% APES (UV × 6 + 120° C. 5 min) | Precipitate 98.00 wt. % | Precipitate 95.46 wt. % |
| 6.5 | 5% TAIC 1% APES (UV × 8 + 120° C. 5 min) | Precipitate 99.03 wt. % | Precipitate 98.12 wt. % |
| 6.6 | 5% TAIC 1% APES (UV × 10 + 120° C. 5 min) | Precipitate 98.29 wt. % | Precipitate 99.08 wt. % |

TABLE 7

Influence of wavelength (H-Bulb and D-Bulb) on UV crosslinking of PFE-1 + Alkene + Amine

| | | H-Bulb, UV 10 times + 120° C. 5 min | D-Bulb, UV 10 times + 120° C. 5 min |
|---|---|---|---|
| Comparative Example | | | |
| D | 5% Fluorinated ether diene 2%1173 Control | Viscosity builds up | Soluble |
| Examples | | | |
| 7.1 | 5% TAIC 0.5% APES | Precipitate 96.98 wt. % | Precipitate 97.02 wt. % |
| 7.2 | 5% TAIC 1% APES | Precipitate 98.29 wt. % | Precipitate 99.08 wt. % |
| 7.3 | 5% TAIC 0.5% N-Me-APMS | Precipitate 94.77 wt. % | Precipitate 91.47 wt. % |
| 7.4 | 5% TAIC 1% N-Me-APMS | Precipitate 95.98 wt. % | Precipitate 97.88 wt. % |
| 7.5 | 5% TAIC 0.5% N,N-DiMe-APMS | Precipitate 97.85 wt. % | Precipitate 98.36 wt % |
| 7.6 | 5% TAIC 1% N,N-DiMe-APMS | Precipitate 98.37 wt. % | Precipitate 98.28 wt. % |
| 7.7 | 5% Fluorinated ether diene 1% APES | Precipitation 90.64 wt. % | Precipitation 87.25 wt. % |
| 7.8 | 5% Fluorinated ether diene 1% N-Me-APMS | Precipitation 87.13 wt. % | Precipitation 84.30 wt. % |

TABLE 7-continued

Influence of wavelength (H-Bulb and D-Bulb) on UV crosslinking of PFE-1 + Alkene + Amine

| | | H-Bulb, UV 10 times + 120° C. 5 min | D-Bulb, UV 10 times + 120° C. 5 min |
|---|---|---|---|
| 7.9 | 5% Fluorinated ether diene 1% N,N-DiMe-APMS | Precipitation 91.95 wt. % | Precipitation 88.62 wt. % |
| 7.10 | 5% Fluorinated ether diene 0.5% APES 2%1173 | Precipitate 88.11 wt. % | Precipitate 85.92 wt. % |
| 7.11 | 5% Fluorinated ether diene 1% APES 2%1173 | Precipitate 94.40 wt. % | Precipitate 95.17 wt. % |
| 7.12 | 5% Fluorinated ether diene 0.5% N-Me-APMS 2%1173 | Precipitate 81.26 wt. % | Precipitate 81.39 wt. % |
| 7.13 | 5% Fluorinated ether diene 1% N-Me-APMS 2%1173 | Precipitate 89.13 wt. % | Precipitate 88.61 wt. % |
| 7.14 | 5% Fluorinated ether diene 0.5% N,N-DiMe-APMS 2%1173 | Precipitate 90.33 wt. % | Precipitate 91.51 wt. % |
| 7.15 | 5% Fluorinated ether diene 1% N,N-DiMe-APMS 2%1173 | Precipitate 92.82 wt. % | Precipitate 94.89 wt. % |

TABLE 8

Effect of an aminosilane ester on photochemically crosslinking PFE-2 with alkenes

| Example | Allyl silane | Thermally cured at 120° C. 5 min | UV cured 10 times + 120° C. 5 min |
|---|---|---|---|
| 8.1 | 5% ATES 1% APES | Soluble | Swell 81.19 wt. % |

TABLE 9

Influence of wavelength (H-Bulb and D-Bulb) on UV crosslinking of PFE-2 + TAIC

| Example | | H-Bulb, UV 10 times + 120° C. 5 min | D-Bulb, UV 10 times + 120° C. 5 min |
|---|---|---|---|
| 9.1 | 5% TAIC 1% APES | Swell, 82.28 wt. % | Swell, 83.87 wt. % |

TABLE 10

Photochemically crosslinked PFE-1 (UV cure only or UV + thermal cure) at 120° C. for 5 minutes

| Example | | UV only | UV + 120° C. 5 min |
|---|---|---|---|
| 10.1 | 5% TAIC 1% APES (UV × 4) | Precipitate 86.50 wt. % | Precipitate 97.72 wt. % |

Preparation of Fluoropolymer Solution with Dispersed Crystalline Fluoropolymer Particles:

Perfluoroelastomer latex PFE-1 was mixed with crystalline fluoropolymer latexes PFA, PTFE, or with THV respectively at the weight ratios described in the Table 11. The solutions were vortex mixing for 1-2 minutes. Subsequently, the well-mixed solutions were froze at −20° C. temperature for 4 hours, and then taken out and thawed in warm water. After thawing, the precipitates were filtered and washed with deionized (DI) water. The obtained solids were dried in an oven at 100° C. for 1-2 hours. The dried coagulated solids were mixed with HFE to form a 10 wt. % solution in HFE. TAIC and APS was also added to the HFE composition as indicated in Table 11. Each composition was placed in a shaker for 3-4 hours obtaining a stable and well-dispersed homogeneous composition.

Samples were prepared by depositing a 3 g solution onto PET film. The coated film was dried at ambient temperature for 2 hours and at 50° C. for 20 min. After the samples were completely dried, the PET film samples were placed on a wooden or a stainless steel board and cured under a single 500 watt H-bulb for 5-10 runs with a speed of 30 ft per minute (as indicated in the tables). After UV curing, some samples were also thermally cured at 120° C. for 5 min in an oven (as indicated in Table 11).

The UV cured samples (1-2 mils in thickness) were peeled off from the PET film, weighed, and then dissolved with HFE in a vial. The mass ratio of cured PFE sample/HFE solvent was 5/95. The vial was subjected to vigorous shaking overnight (~12 hours) before any observation was recorded as described in the following table. The precipitated samples (i.e. crosslinked PFE) in the HFE solutions were collected, dried and weighed.

TABLE 11

Crystalline Fluoropolymer Particles Coated with Photochemically Crosslinked PFE-1

| Example | | UV cured 10 times | UV cured 10 times + 120° C. 5 min |
|---|---|---|---|
| 11.1 | PFE-1/THV340 (70:30) 2.5% TAIC 1% APS | 82.34 wt. % | 92.81 wt. % |
| 11.2 | PFE-1/THV-2 (70:30) 2.5% TAIC 1% APS | 89.92 wt. % | 94.30 wt. % |
| 11.3 | PFE-1/THV-1 (70:30) 2.5% TAIC 1% APS | 91.35 wt. % | 96.32 wt. % |
| 11.4 | PFE-1PFA (70:30) 2.5% TAIC 1% APS | 93.58 wt. % | 96.65 wt. % |
| 11.5 | PFE-1/PTFE (70:30) 2.5% TAIC 1% APS | 92.11 wt. % | 94.21 wt. % |

TABLE 12

Effect of an aminosilane ester on UV curing of PFE-1
Perfluoroelastomer PFE-1 solutions were prepared by cutting gums separately into small pieces and adding them into HFE solvent (HFE-7300 or HFE-7500) to make a 10 wt. % PFE in HFE solution (10 g PFE and 90 g HFE) as described above. The aminosilanes, alkoxy silanes, and 1173 were dissolved or dispersed in HFE to form 1 wt. % or 5 wt. % solutions or suspensions and combined with PFE-1 solutions as described above.

|  | Thermally cured at 120° C. for 5 minutes | UV cured for 10 runs + Thermally cured at 120° C. for 5 minutes |
| --- | --- | --- |
| Primary Amino silane |  |  |
| Ex. 12-1 - 0.5% APES | Soluble | Viscosity builds up |
| Ex. 12-2 - 1% APES | Soluble | Gel 64.75 wt. % |
| Ex. 12-3 - 1.5% APES | Soluble | Swell 84.72 wt. % |
| Ex. 12-4 - 3% APES | Soluble | Precipitate 86.06 wt. % |
| Ex. 12-5 - 5% APES | Soluble | Precipitate 88.33 wt. % |
| Ex. 12-6 - 3% APES 2% TEOS | Soluble | Precipitate 86.80 wt. % |
| Ex. 12-7 - 3% APES 2% TMOS | Soluble | Precipitate 83.59 wt. % |
| Ex. 12-8 - 1.5% APES 1%1173 | Soluble | Swell 87.53 wt. % |
| Ex. 12-9 - 3% APES 1%1173 | Soluble | Precipitate 91.26 wt. % |
| Ex. 12-10 - 3% APES 2%1173 | Soluble | Precipitate 86.69 wt. % |
| Ex. 12-11 - 5% APES 2%1173 | Soluble | Precipitate 87.92 wt. % |
| Ex. 12-12 - 5% APES 5%1173 | Soluble | Precipitate |
| Secondary Amino silane |  |  |
| Ex. 12-13 - 5% N-ME-APMS | Soluble | Gel 85.60 wt % |
| Ex. 12-16 - 5% N-ME-APMS 0.5% APES | Soluble | Precipitate 80.61 wt % |
| Ex. 12-17 - 5% N-ME-APMS 1% APES | Soluble | Precipitate 81.68wt % |

TABLE 13

Effect of an aminosilane ester on UV curing PFE-2

| Primary Amino silane | Thermally cured at 120 C. for 5 minutes | UV cured for 10 runs + Thermally cured at 120 C. for 5 minutes |
| --- | --- | --- |
| Ex. 13-1 -5% APES | Viscosity increase | Swell, 88.94 wt % |

Some of the compositions of Examples 12-1 to 13-1 were cured with a D-bulb instead of an H-bulb and provided similar crosslinking results.

General Procedure—Compounded Fluoropolymers (CFP) Having Inorganic Fillers:

Compounded fluoropolymers (CFP) were prepared by combining 100 g of perfluoroelastomer with fillers according to Table 14 using conventional rubber processing equipment to provide well-mixed, solid mixtures of perfluoroelastomer and filler. Glass bubbles were treated with a fluorinated hydrophobic surface treatment prior to use.

TABLE 14

Compound Fluoropolymers (CFP) Prepared

| CFP | Description |
| --- | --- |
| CFP-1 | Compounded fluoropolymer of PFE-3 with FG-Si at 70/30 by weight |
| CFP-2 | Compounded fluoropolymer of PFE-3 with FG-Si at 50/50 by weight |
| CFP-3 | Compounded fluoropolymer of PFE-3 with FG-Si at 80/20 by weight |
| CFP-4 | Compounded fluoropolymer of PFE-3 with glass bubble at 80/20 by weight |
| CFP-5 | Compounded fluoropolymer of PFE-3 with FS20 at 70/30 by weight |
| CFP-6 | Compounded fluoropolymer of PFE-3 with FS550 at 70/30 by weight |
| CFP-7 | Compounded fluoropolymer of PFE-1 with FG-Si at 70/30 by weight |
| CFP-8 | Compounded fluoropolymer of PFE-1 with glass bubbles at 80/20 by weight |

SRC220 Surface Treated Glass Bubbles

A solution was prepared by adding 9 g of 3M Stain Resistant Additive SRC220 (an aqueous fluorinated polyurethane dispersion, 15% solids) to 50 g DI water, stirring for 5 minutes, and transferring the solution to a 60-mL syringe with a 18 gauge needle syringe.

To a 1-gallon size Lodige Popenmier mixer was added 900 g of iM16K glass bubbles. The surface treatment solution was sprayed while mixing at a 400 rpm mixing rate. After mixing at room temperature for 15 minutes, the mixing vessel was heated to 120-130° C. for 1.5 hrs.

General Procedure for Coatings from PFE-3 and CQ0382 or CQ1082:

PFE coating solutions were prepared as generally described above to obtain 9 wt. % solutions in HFE. The fused silica fillers were separately dispersed in the HFE with a high-speed mixer to form 50 wt. % solids dispersions. The PFE solution and fused silica dispersion were combined with each other followed by addition of the curing agent, alkoxy silane, and glass fibers. PFE composite films were obtained by coating the solutions with a comma bar coater having a 300 um to 350 um gap. The obtained coatings were coated onto a release liner (precoated with a fluorinated release coating) and then dried in a 100° C. oven to remove solvents. The films were then separated from the liners and placed into a Teflon coated metal tray and baked at 160° C. to 200° C. to crosslink the system. The thickness of the obtained films ranged from 230 um to 290 um. The films were characterized with different test methods. The concentration of the components (i.e. solids) and results are summarized in Tables 15 to 17.

TABLE 15

PFE-3 compositions and CTE results

| Example | PFE-3 (g) | CQ0382 (g) | BTESPA (%) | TEOS (%) | QF (%) | CTE (50° C.-90° C.) | CTE (90° C.-130° C.) |
|---|---|---|---|---|---|---|---|
| 15.1 | 40 | 60 | 4.8 | 1.5 | 0 | 60 | 108 |
| 15.2 | 40 | 60 | 4.8 | 0.6 | 0 | 39 | 86 |
| 15.3 | 40 | 60 | 4.8 | 0.3 | 0 | 37 | 79 |
| 15.4 | 40 | 60 | 4.8 | 0.6 | 0.3 | 34 | 56 |
| 15.4 | 50 | 50 | 6 | 0.6 | 0 | 60 | 96 |
| 15.5 | 60 | 40 | 7.2 | 0.6 | 0 | 39 | 80 |

TABLE 16

Dielectric constant (Dk), Dissipation loss (Df), T-peel from Copper, and Static Water Contact Angle results of PFE-3 compositions

| Example | Dk | Df | T-Peel from Copper | Water Contact Angle |
|---|---|---|---|---|
| 15.1 | 2.45 | 0.0019 | 0.6 N/mm | 103-106° |
| 15.2 | 2.37 | 0.0018 | 0.6 N/mm | 103-106° |
| 15.3 | 2.24 | 0.0017 | 0.6 N/mm | 103-106° |
| 15.4 | 1.98 | 0.002 | 0.6 N/mm | 103-106° |
| 15.5 | 2.23 | 0.0019 | 0.6 N/mm | 103-106° |

TABLE 17

PFE-3 compositions with different silica size and CTE results

| Example | PFE-3 (g) | CQ0382 (g) | CQ1082 (g) | BTESPA (%) | TEOPS (%) | CTE (50° C.-90° C.) |
|---|---|---|---|---|---|---|
| 17.1 | 30 | 70 | 0 | 3 | 0.3 | 4 |
| 17.2 | 30 | 0 | 70 | 3 | 0.3 | 95 |

General Procedure for Coatings from PFE-3 and Fused Silica (SF550):

A solution of PFE-3 with fused silica in HFE was prepared as described generally above using PFE-3 gum (20 g, cut in small piece), 3M fused silica (8.6 g, FS550), and HFE (290 g). The stable coating solution had 6.45 wt % of PFE-3, and the ratio of PFE-3 to FS550 was 70/30 by weight. Similarly, a 6.45% coating solution of PFE-3 with fused silica at 80/20 by weight was prepared using 20 g PFE-3, 6.0 g FS550 and 290 g HFE.

All crosslinkers (e.g. BTESPA) were dissolved in HFE to form 5% or 10% solutions. 3% to 5% BTESPA crosslinker was formulated in PFE-3/FS550 solution based on the PFE amount. Alkoxy silane compounds were formulated with PFE-3/FS550 solution based on the weight of FS550 as shown below. After fully mixing, the solution was coated on either RL Film or DuPont PFA film at different thicknesses and then cured at 140° C. in an oven for 5 hours. The coatings on release liner were removed from the liner prior to testing, and the coatings on PFA film were tested directly on the PFA film. CTE was tested from films released from liner. The formulations and test results are summarized in Tables 18 and 19. For some examples, moisture uptake (23° C./5-95% RH) was measured. The moisture uptake of sample 18.6 was 0.11%.

TABLE 18

Coating Compositions from PFE-3 and SF550 Fused Silica

| Example | PFE-3 (g) | FS550 (g) | BTESPA | Alkoxysilane Compound | Substrate |
|---|---|---|---|---|---|
| 18.1 | 95 |  | 5% |  | RL Film |
| 18.2 | 70 | 30 | 1.5% | 3% C4-Si | RL Film |
| 18.3 | 70 | 30 | 1.5% |  | PFA |
| 18.4 | 70 | 30 | 3% |  | PFA |
| 18.5 | 70 | 30 | 1.5% | 3% HFPO-Si | PFA |
| 18.6 | 70 | 30 | 1.5% | 3% C6-Si | PFA |
| 18.7 | 70 | 30 | 3% | 1% TEOS | PFA |

TABLE 19

Testing Results of Coating Compositions from PFE-3 and SF550 Fused Silica

| Example | Thickness (um) | Dk | Df | CTE (5-30° C.) | CTE (50-60° C.) |
|---|---|---|---|---|---|
| 18.1 | 110 | | 0.0022 | | |
| 18.2 | 41 | 2.35 | 0.0022 | 102.7 | |
| 18.3 | 12 | | 0.0009 | | |
| 18.4 | 17 | | 0.0008 | | |
| 18.5 | 15 | | 0.0009 | | |
| 18.6 | 15 | | 0.0009 | 111 | 126 |
| 18.7 | 10 | | 0.0014 | | |

Coatings from Compounded Fluoropolymers:

For coating solution formulations, all CFPs (20 g, cut in small piece) were first dissolved in HFE (180 g) to obtain a 10% solution after shaking vigorously overnight in a sealed glass bottle. All crosslinkers (e.g. BTESPA) were dissolved in HFE to have 5% or 10% solution. All crosslinkers were formulated in CFP solutions based on the total weight of CFP as shown in Table 20. After fully mixing, the solution was coated on either RL Film or DuPont PFA film or FEP film at different thickness, then cured in a 140° C. oven for 5 hours prior to testing. The coatings on release liner were removed from the liner prior to testing, and the coatings on PFA film were tested directly on the PFA film. CTE was tested from films released from liner. The results are summarized in Tables 20 and 21. For some of the examples, moisture uptake (23° C./5-95% RH) was measured. Two examples that exhibited good moisture uptake were 20.12 and 20.14, that had moisture uptakes of 0.15% and 0.13%, respectively.

TABLE 20

Compounded Fluoropolymer Coating Formulations

| Example | CFP | BTESPA | Alkoxy Silane Compound | Substrate |
|---|---|---|---|---|
| 20.1 | CFP-1, 97% | 1.5% | 1.5% TEOS | FEP |
| 20.2 | CFP-1, 96% | 3% | 1% TEOS | PFA |
| 20.3 | CFP-1, 98% | 1% | 1% TEOS | PFA |
| 20.4 | CFP-1, 98% | 1% | 1% TEOS | RL Film |
| 20.5 | CFP-1, 95% | 1.5% | 5% HFPO-Si | RL Film |
| 20.6 | CFP-2, 95% | 5% | | PFA |
| 20.7 | CFP-2, 95% | 1.5% | 5% HFPO-Si | PFA |
| 20.8 | CFP-2, 95% | 1.5% | 5% C6-Si | PFA |
| 20.9 | CFP-3, 97% | 1.5% | 1.5% TEOS | FEP |
| 20.10 | CFP-4, 95% | 2.5% | 2.5% TEOS | FEP |
| 20.11 | CFP-5, 100% | 1.5% | | PFA |
| 20.12 | CFP-5, 95% | 5% | | PFA |
| 20.13 | CFP-6, 100% | 1.5% | | PFA |
| 20.14 | CFP-6, 95% | 5% | | PFA |

TABLE 21

Dk, Df and CTE of Compounded Fluoropolymer Coatings

| Example | Thickness (um) | Dk | Df | CTE (5-30° C.) | CTE (60-75° C.) |
|---|---|---|---|---|---|
| 20.1 | 7 | 2.60 | 0.0024 | | |
| 20.2 | 8 | | 0.0016 | | |
| 20.3 | 8 | | 0.0024 | | |
| 20.4 | 125 | | 0.0023 | | |
| 20.5 | 83 | | 0.0022 | | |
| 20.6 | 6 | | 0.0034 | | |
| 20.7 | 7 | | 0.0024 | | |
| 20.8 | 7 | | 0.0024 | | |
| 20.9 | 6 | 2.36 | 0.0023 | | |
| 20.10 | 22 | | 0.0028 | | |
| 20.11 | 10 | | 0.0013 | | |
| 20.12 | 11 | | 0.0018 | 110 | 154 |
| 20.13 | 8 | | 0.0014 | | |
| 20.14 | 9 | | 0.0018 | 128 | 181 |

Compounded Fluoropolymers Coatings Cured by UV:

The 10% coating solutions of compounded fluoropolymers with (e.g. silica) inorganic fillers were prepared as generally described above from 20 g PFE-1 based CFP gum (cut in small pieces) and 180 g HFE after shaking vigorously overnight at room temperature in a sealed glass bottle. Crosslinkers (BTESPA and TAIC) were dispersed in HFE to yield a 5% solution. All crosslinkers (BTESPA and TAIC) were formulated in CFP solution based on the total weight of CFP as shown below. After fully mixing, the solution was coated on either DuPont PFA film or FEP film at different thicknesses. The coatings were first dried in a 100° C. oven for 5 minutes, then cured with H-bulb UV at 100% power under nitrogen by passing 10 times at 30 fpm. The results are summarized in Table 22.

TABLE 22

Compounded Fluoropolymer Coatings Formulations and Dk/Df/CTE Results

| Example | CFP | BTESPA | TAIC | TEOS | Substrate | Thickness (um) | Dk | Df |
|---|---|---|---|---|---|---|---|---|
| 22.1 | CFP-7, 95.5% | 1.5% | 3% | | FEP | 8 | 2.53 | 0.0026 |
| 22.2 | CFP-7, 96% | 1% | 3% | | PFA | 16 | | 0.0020 |
| 22.3 | CFP-8, 97.5% | 1.5% | | 1% | PFA | 16 | | 0.0027 |

General Procedure for Coatings from PFE-3 and Silica Particles:

PFE coating solutions were prepared as generally described above to obtain 5 wt. % PFE-3 solutions in HFE-7300. The fused silica fillers were separately dispersed in the HFE with a high-speed mixer to form 50 wt. % solids dispersions.

Bis(3-trimethoxysilylpropyl)amine (BTMSPA) was dissolved or dispersed in HFE-7300 to form 10 wt. % solutions or suspensions. To the PFE-3 solution were added BTMSPA and silica particle as indicated in Table 23. The BTMSPA in HFE-7300 solution was homogenized using a vortex shaker at 1000 revolutions per minute (rpm) for 10 seconds to form a well dispersed slurry before being added to the PFE-3/HFE-7300 solution. The percentage indicated in the formula (e.g., 5%, 2%) was the mass fraction based on the solid content of PFE-3. For instance, PFE-3+5% BTMSPA means: the solid content of PFE-3/APES=95:5. The prepared solutions described above were typically stirred under vortex for 1-2 minutes at 2500 rpm. All above prepared solutions were coated on clean PET release liner or copper foil with a No. 24 Meyer rod, and the resulting coatings were normally cured at 165° C. for 20 minutes to 1 hour. The cured films were released from the liner and were evaluated for Dk, Df, moisture uptake, and CTE.

overnight or longer to obtain stable and well-dispersed solutions in HFE-7300 (Table 24).

General Procedure for Perfluoropolymer Coating Solution Preparations Optionally with Aminosilane Ester or Fluorinated Amidine Curatives and Inorganic Fillers Including Spherical Silica, Fiber Glass Particles and Boron Nitride Particles for Coatings, Electric Property Measurements and Copper Bonding Adhesion Measurements:

PFE-3. PFE-3/PFA-2 or PFE-3/PTFE were dissolved/dispersed in HFE-7300 by cutting the fluoropolymer materials into small pieces and placing them into separated glass jars and adding HFE-7300 solvent to each of the glass jars. The containers were well sealed with PTFE tape and paraffin film. The solution was then subject to vigorous shaking overnight (~12 hours) to obtain a completely homogenous solutions of 5-8 wt % PFE-3 in HFE-7300 (e.g., 5 g PFE-3 and 95 g HFE-7300), 10 wt % PFE-3/PTFE or PFE-3/PFA-2 in HFE-7300.

To the PFE-3, PFE-3/PTFE or PFE-3/PFA-2 dispersion solutions were separately added BTMSPA, an aminosilane, or a fluorinated amidine curative, in a percentage described in Table 24 for preparing perfluorinated polymer HFE solutions for coatings. In the case of coating solutions containing

TABLE 23

Perfluoropolymer Composite Coatings Formulations and Dk/Df/Moisture Uptake/CTE Results

| Example | Formulation | Dk | Df | Moisture uptake | CTE (5-30° C.) | CTE (60-145° C.) |
|---|---|---|---|---|---|---|
| 23.1 | PFE-3/BTMSPA (95/5) | 2.35 | 0.0022 | | | |
| 23.2 | PFE-3/GB/BTMSPA/TEOS (80/20/2.5/1.5) | 2.36 | 0.0028 | 0.15% | | |
| 23.3 | PFE-3/FG-Si/BTMSPA/TEOS (70/30/1.5/1.5) | 2.36 | 0.0028 | 0.15% | | 5 |
| 23.4 | PFE-3/FS 20/BTMSPA (70/30/5) | 2.36 | 0.0018 | 0.15% | 110 | 154 |
| 23.5 | PFE-3/FS 550/BTMSPA (70/30/1.5) | | 0.0014 | | | |
| 23.6 | PFE-3/FS 550/BTMSPA (70/30/5) | | 0.0018 | | 128 | 180 |
| 23.7 | PFE-3/FS 550/C4-Si/BTMSPA (70/30/1.5/1.5) | | 0.0020 | 0.09% | 128 | 181 |

General Procedure for Perfluoroelastomer-Perfluoropolastic Nanoparticle Dispersion Coating Solution Preparations: PFE-PFA or PFE-PTFE Coagulations & Dispersion Solution Preparations Perfluoroelastomer PFE-3 (30.5 wt %), was co-coagulated with PFA latex (30 wt % PFA-2 latex) or with a PTFE latex (30 wt % obtained from the dilution of 55 wt % TFM-2 latex) in the ratios described in Table 24. The latex solutions were mixed and were put on a roller for 20 minutes. Subsequently, the well-mixed solutions were frozen in a fridge overnight. They were taken out and thawed in warm water or in an oven at 60° C. After melting, the precipitates were filtered and washed with deionized (DI) water at least three times. The obtained solids were dried in an air-circulated oven at 55-65° C. overnight. The dried PFE/PFA-2 and PFE/PTFE co-coagulated solids were mixed with HFE-7300 separately in 5-20 wt % solutions. They were placed in a shaker or a roller at a speed of 80 cycles/minute inorganic fillers, inorganic fillers or mixed fillers were weighed in glass jars separately, and to each of the inorganic fillers or mixed fillers was added a small amount of HFE solvent and vortexed for 1-2 minutes. To the HFE-7300 filler or mixed filler slurries were individually added the amounts of the above prepared fluoropolymer HFE solutions and curatives in ratios described in Table 24.

An alternative way to prepare the above described inorganic filler-containing fluoropolymer-HFE solutions was to first mix fluoropolymers PFE-3, PFE-3/PFA-2 or PFE-3/PTFE with one or more inorganic fillers in ratios and subsequently add the amount of HFE-7300 to make certain wt % solution concentrations described in Table 24. The resulting prepared solutions were placed a shaker or a roller at a speed of 80 cycles/minute overnight or longer. The resulting solutions were homogenous. Aminosilane BTMSPA or other curatives were added to the freshly prepared fluoropolymer-inorganic filler-HFE-7300 solutions in ratios described in Table 24. Also, the percentage in the formula (e.g., 5%, 2%) was the mass fraction based on the solid content of PFE-3. For instance, PFE-3+5% BTMSPA means: the solid content of PFE-3/APES=95:5. The prepared solutions described above were typically stirred under vortex for 1-2 minutes at 2500 rpm. All above prepared solutions were coated on 3M release liner with a No. 24 Meyer rod or simply poured the solutions onto the liner to obtain thicker coating samples, and the resulting coatings were normally dried at room temperature overnight or cured 120-165° C. for 20-105 minutes. The cured films were released from the liner and were available for adhesion to copper, Dk/Df measurements and CTE measurements shown in in Table 24.

Perfluoropolymer solutions were coated on a release liner and dried at room temperature overnight or cured at 120-165° C. for 30-105 minutes. The resulting films with an average 15-40 micron thickness were released from the liner and subsequently laminated against Cu foil in a Sandwich structure for bonding at temperatures indicated in the tables and under 1-2 ton pressure for normally 30 minutes.

TABLE 24

Cu-Bondable Perfluorinated Polymer Films Obtained by Coating

| Example | Formulation | Lamination condition, ° C. | Cu Peel force, N/cm | Dk/Df, 25 GHz | CTE, $2^{nd}$ Heat, μm/(m · ° C.) |
|---|---|---|---|---|---|
| 24.1 | Control PFA film | 310 | <2 | /0.0006-0.0009 | |
| 24.2 | [PFE-3/PFA-2 (6:4)]/BN CFP 012/BTMSPA (80/20/3) | 200 | 8.9 | /0.0018 | 119 |
| 24.3 | [PFE-3/PFA-2 (6:4)]/BN CFP 012/fluorinated amidine (80/20/3) | 200 | 5.8 | /0.0013 | 119 |
| 24.4 | [PFE-3/PFA-2 (6:4)]/BN CFP 0075/BTMSPA (80/20/3) | 200 | 7.9 | /0.0018 | 127 |
| 24.5 | [PFE-3/PFA-2 (6:4)]/BN CFP 0075/fluorinated amidine (80/20/3) | | 5.4 | /0.0013 | 186 |
| 24.6 | [PFE-3/PFA-2 (6:4)]/FT9110/BN CFP 012/BTMSPA (60/20/20/4) | | Not tested | /0.0028 | 129 |
| 24.7 | [PFE-3/PFA-2 (7:3)]/FT9110/BN CFP 012/BTMSPA (50/25/25/4) | | 9.2 | /0.0037 | 76 |
| 24.8 | 63.5% PFE-3/PFA-2 (7/3) + 28.6% BN CFP 012 + 4.8% FT9114 + 4% BTMSPA | 200 | 6.9 | | |
| 24.9 | 66.7% PFE-3/PFA-2 (7/3) + 28.6% BN CFP 012 + 4.8% FT9114 + 4% BTMSPA | 200 | 7.3 | 2.14/0.0019 | 75 |
| 24.10 | 70% PFE-3/PFA-2 (70/30) +23% FT9114, 5% BTMSPA + 2% C-6Si | 200 | 20.8 | 2.20/0.0042 | 16 |
| 24.11 | 70% PFE-3/PFA-2 (70/30) + 23% FG6616, 5% BTMSPA + 2% C-6Si | 200 | 19.8 | 2.04/0.0055 | 111 |
| 24.12 | 70% PFE-3/PFA-2 (70/30) + 23% FG6608, 5% BTMSPA + 2% C-6Si | 200 | 17.1 | 1.92/0.0052 | 30 |
| 24.13 | 70% PFE-3/PFA-2 (70/30) + 23% FG3004, 5% BTMSPA + 2% C-6Si | 200 | 22.1 | 2.31/0.0044 | 106 |
| 24.14 | 70% PFE-3/PFA-2 (70/30) + 23% Wallonites + 5% BTMSPA + 2% C-6Si | 200 | 16.9 | 2.67/0.0033 | 108 |
| 24.15 | 40% PFE-3/TFM-2 (60/40), 60% CQ0382, 5% BTMSPA | 200 | 6.7 | 2.58/0.0016 | 61 |
| 24.16 | 65% PFE-3/PFA-2 (70/30), 28% GB, 5% BTMSPA, 2% C-6Si | 200 | 5.5 | | |
| 24.17 | 60% PFE-3/TFM-2 (60/40) + 35% CQ0382 + 5% FT9114 + 1.5% PFE301C + 5% BTMSPA | 200 | 8.9 | 2.18/0.0023 | 161 |
| 24.18 | [PFE-3/PFA-2 (7:3)]/FT9110/BTMSPA (60/40/3) | 200 | 11.5 | /0.0040 | 75 |
| 24.19 | [PFE-3/PFA-2 (7:3)]/FT9110/BTMSPA (50/50/3) | 200 | 11.4 | /0.0049 | 69 |

TABLE 24-continued

Cu-Bondable Perfluorinated Polymer Films Obtained by Coating

| Example | Formulation | Lamination condition, °C. | Cu Peel force, N/cm | Dk/Df, 25 GHz | CTE, $2^{nd}$ Heat, μm/(m · °C.) |
|---|---|---|---|---|---|
| 24.20 | [PFE-3/PFA-2 (7:3)]/BN CFP 0075/CQ0382/BTMSPA (50/15/35/4) | 200 | | 2.85/0.0015 | 113 |
| 24.21 | [PFE-3/PFA-2 (7:3)]/BN CFP 0075/CQ0282/BTMSPA (50/15/35/4) | 200 | | 2.08/0.0014 | 82 |
| 24.22 | [PFE-3/PFA-2 (7:3)]/FT9110/CQ0282/BTMSPA (50/15/35/4) | 200 | | | 120 |
| 24.23 | [PFE-3/PFA-2 (7:3)]/FT9110/CQ0382/BTMSPA (50/15/35/4) | 200 | | 2.95/0.0030 | 133 |
| 24.24 | [PFE-3/PFA-2 (7:3)]/FT9110/CQ0282/BTMSPA (50/25/25/4) | 200 | | 2.83/0.0038 | 92 |
| 24.25 | [PFE-3/PFA-2 (7:3)]/FT9110/CQ0382/BTMSPA (50/25/25/4) | 200 | | 2.69/0.0049 | 108 |

General Procedure for Perfluoropolymer Coating Solution Preparations with Inorganic Fillers:

Solutions containing co-coagulated perfluoropolymers and one or more inorganic filler (e.g. silica nanoparticles, quartz fibers and boron nitride) are referred to as fluoropolymer resins and were dissolved/dispersed in HFE-7300. The Solutions were prepared in the following stepwise procedure: The dry inorganic and fluoropolymer resin was combined in a container and HFE-7300 was added. The container was then sealed and placed on a roller to gently agitate overnight or longer until the solution was determined to be completely mixed and ready for coating. The solution was then subsequently transferred to a shear mixing container and mixed at 2500-3500 rpm for 3-4 minutes. To the well mixed solution, BTMSPA was added (5% mass of resin in solution). After the BTMSPA was added, the solution was vortexed for thorough mixing and then placed on a shaker for 30-60 minutes. The solution is then coated on release liner using a No. 24 Meyer rod and tape guides to control the film thickness. The films were air dried at room temperature and subsequently removed from the release liner and thermo-cured at 165° C. for 1 hour. The cured samples were then ready for testing.

TABLE 25

Perfluorinated Polymer Composite Coatings*

| Example | Formulation | Cu Bonding | Dk/Df (25 GHz) eps' | tan delta | CTE (1st MD) | CTE (2nd MD) | CTE (1st TD) | CTE (2nd TD) |
|---|---|---|---|---|---|---|---|---|
| 25.1 | PFE-3/PFA-3 (7:3)/FS 550/QF [67:28:5] | 8.7-12.3 | 2.38 | 0.0018 | 177 | 14 | 105 | 18 |
| 25.2 | PFE-3/PTFE5033 (7:3)/FS 550/QF [67:28:5] | 10.1-11.4 | 2.50 | 0.0022 | 66 | 14 | 175 | 29 |
| 25.3 | PFE-3/PFA-3 (7:3)/FS 550/CQ0382/FT9114/QF [60:16:16:4:4] | 10.3-12.6 | 2.41 | 0.0019 | 109 | 11 | 110 | 26 |
| 25.4 | PFE-3/PTFE5033 (7:3)/FS 550/CQ0382/FT9114/QF [60:16:16:4:4] | 13.2-17.4 | 2.52 | 0.0022 | 154 | 20 | 84 | 18 |

*Average film thickness of 100 microns.

TABLE 26

Perfluorinated Polymer Composite Coatings*

| Example | Formulation | Cu Bonding | Dk/Df (25 GHz) eps' | tan delta | CTE (1st MD) | CTE (2nd MD) | CTE (1st TD) | CTE (2nd TD) |
|---|---|---|---|---|---|---|---|---|
| 26.1 | PFE-3/PFA-2 (7:3)/BN CFP | 8.1 | 2.77 | 0.0011 | 133 | 13 | 215 | 22 |

TABLE 26-continued

Perfluorinated Polymer Composite Coatings*

| Example | Formulation | Cu Bonding | Dk/Df (25 GHz) eps' | tan delta | CTE (1st MD) | CTE (2nd MD) | CTE (1st TD) | CTE (2nd TD) |
|---|---|---|---|---|---|---|---|---|
| 26.2 | 012/QF [60:37:3] PFE-3/PFA-2 (7:3)/BN CFP | 8.0 | 2.71 | 0.0014 | 210 | 12 | 141 | 18 |
| 26.3 | 012/QF/FT9114 [60:34:3:3] PFE-3/PFA-2 (7:3)/BN CFP | 11.2 | 2.76 | 0.0013 | 163 | 14 | 168 | 43 |
| 26.4 | 012/CQ0382/QF [60:18.5:18.5:3] PFE-3/PFA-2 (7:3)/BN CFP | 10.8 | 2.72 | 0.0016 | 106 | 13 | 90 | 31 |
| 26.5 | 012/CQ0382/QF/FT9114 [60:17:17:3:3] PFE-3/PFA-2 (7:3)/BN CFP | 13.2 | 2.67 | 0.0014 | 179 | 37 | 191 | 17 |
| 26.6 | 012/CQ0382/QF [60:12.3:24.7:3] PFE-3/PFA-2 (7:3)/BN CFP 012/CQ0382/QF/FT9114 [60:11.3:22.7:3:3] | 13.6 | 2.69 | 0.0017 | 72 | 17 | 112 | 27 |

*Average film thickness of 100-130 microns.

What is claimed is:

1. An electronic telecommunication article comprising a crosslinked fluoropolymer layer, wherein the fluoropolymer
    comprises at least 80, 85, or 90% by weight of polymerized units of perfluorinated monomers and cure sites; and fumed and/or fused silica having an aggregate particle size of at least 500 nm;
    wherein the article is an integrated circuit, printed circuit board, an antenna, or an optical cable.

2. The electronic telecommunication article of claim 1 wherein the crosslinked fluoropolymer layer is a substrate, patterned layer, insulating layer, passivation layer, cladding, protective layer, or a combination thereof.

3. The electronic telecommunication article of claim 1 wherein the antenna is an antenna of a computer device or an outdoor structure.

4. The electronic telecommunication article of claim 1 wherein the crosslinked fluoropolymer layer has
    i) a dielectric constant (Dk) of less than 2.75, 2.70, 2.65, 2.60, 2.55, 2.50, 2.45, 2.40, 2.35, 2.30, 2.25, 2.20, 2.15, 2.10, 2.05, 2.00, or 1.95;
    ii) a dielectric loss of less than 0.01, 0.009, 0.008, 0.007, 0.006, 0.005, 0.004, 0.003, 0.002, 0.001, 0.0009, 0.0008, 0.0007, or 0.0006;
    or a combination thereof.

5. The electronic telecommunication article of claim 1 wherein the fluoropolymer further comprises cure sites selected from nitrile, iodine, bromine, and chlorine.

6. The electronic telecommunication article of claim 1 wherein the perfluorinated monomers are selected from tetrafluoroethene (TFE) and one or more unsaturated perfluorinated alkyl ethers.

7. The electronic telecommunication article of claim 6 wherein the unsaturated perfluorinated alkyl ether of the fluoropolymer has the general formula

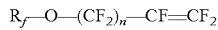

$R_f\text{—O—}(CF_2)_n\text{—CF=CF}_2$ wherein n is 1 or 0 and $R_f$ is a perfluoroalkyl or perfluoroether group.

8. The electronic telecommunication article of claim 1 wherein the crosslinked fluoropolymer is crosslinked with a curing agent is selected from
    i) a peroxide and an ethylenically unsaturated compound;
    ii) one or more compounds comprising an electron donor group and an ethylenically unsaturated group; or
    iii) an amino organosilane ester compound or ester equivalent.

9. The electronic telecommunication article of claim 1 wherein the curing agent comprises at least two ethylenically unsaturated groups or at least one ethylenically unsaturated group and at least one alkoxy silane group.

10. The electronic telecommunication article of claim 1 wherein the crosslinked fluoropolymer is crosslinked with an amine curing agent.

11. The electronic telecommunication article of claim 1 wherein the fluoropolymer comprises 40 to 60% by weight of polymerized units of TFE based on the total weight of the fluoropolymer.

12. The electronic telecommunication article of claim 1 wherein the crosslinked fluoropolymer comprises no greater than 5, 4, 3, 2, 1 or 0.1 wt.-% of polymerized units derived from non-fluorinated or partially fluorinated monomers and/or comprises no greater than 5, 4, 3, 2, 1 or 0.1 wt. % of ester-containing linkages.

13. The electronic telecommunication article of claim 1 wherein the crosslinked fluoropolymer is insoluble in 3-ethoxy perfluorinated 2-methyl hexane or 3-methoxy perfluorinated 4-methyl pentane.

14. The electronic telecommunication article of claim 1 wherein the crosslinked fluoropolymer layer further comprises crystalline fluoropolymer particles.

15. The electronic telecommunication article of claim 1 wherein the crosslinked fluoropolymer layer further comprises silica glass bubbles, glass fibers, or a combination thereof optionally comprising a hydrophobic surface treatment optionally comprising a fluorinated alkoxy silane compound.

16. The electronic telecommunication article of claim 1 wherein the crosslinked fluoropolymer layer further comprises a thermally conductive filler.

17. The electronic telecommunication article of claim 1 wherein the fumed or fused silica has an aggregate particle size of at least 1 micron, 1.5 microns, or 2 microns.

18. The electronic telecommunication article of claim 1 wherein the silica(s) comprises a hydrophobic surface treatment optionally comprising a fluorinated alkoxy silane compound.

19. The electronic telecommunication article of claim 1 wherein the silica(s) is present in an amount of at least 10, 20, 30, 40, 50, 60, or 70 wt. % based on the total amount of the crosslinked fluoropolymer layer.

* * * * *